US012309385B2

(12) United States Patent
Sethuraman et al.

(10) Patent No.: US 12,309,385 B2
(45) Date of Patent: May 20, 2025

(54) APPARATUS AND METHOD FOR CONDITIONAL DECODER-SIDE MOTION VECTOR REFINEMENT IN VIDEO CODING

(71) Applicant: HUAWEI TECHNOLOGIES CO., LTD., Guangdong (CN)

(72) Inventors: Sriram Sethuraman, Bangalore (IN); Jeeva Raj A, Bangalore (IN); Sagar Kotecha, Bangalore (IN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/067,458

(22) Filed: Dec. 16, 2022

(65) Prior Publication Data

US 2023/0188722 A1    Jun. 15, 2023

Related U.S. Application Data

(63) Continuation of application No. 17/249,771, filed on Mar. 12, 2021, now Pat. No. 11,563,948, which is a
(Continued)

(30) Foreign Application Priority Data

Sep. 13, 2018   (IN) .............................. 201831034607

(51) Int. Cl.
*H04N 19/137*    (2014.01)
*H04N 19/105*    (2014.01)
(Continued)

(52) U.S. Cl.
CPC ......... *H04N 19/137* (2014.11); *H04N 19/105* (2014.11); *H04N 19/159* (2014.11);
(Continued)

(58) Field of Classification Search
None
See application file for complete search history.

(56) References Cited

U.S. PATENT DOCUMENTS

2016/0134868 A1\*   5/2016   He ..................... H04N 19/136
                                                          375/240.02
2017/0347093 A1    11/2017   Yu et al.
(Continued)

FOREIGN PATENT DOCUMENTS

CN        102123283 A      7/2011
CN        103051439 A      4/2013
(Continued)

OTHER PUBLICATIONS

Haitao Yang, et al., Subblock-Based Motion Derivation and Inter Prediction Refinement in the Versatile Video Coding Standard, IEEE Transactions On Circuits and Systems for Video Technology, vol. 31, No. 10, Oct. 2021, 16 pages. (Year: 2021).\*
(Continued)

*Primary Examiner* — Lindsay J Uhl
(74) *Attorney, Agent, or Firm* — WOMBLE BOND DICKINSON (US) LLP

(57) ABSTRACT

A method for inter-prediction of a current image block in a current picture of a video is provided. The method includes determining whether a first temporal distance (such as TD0) is equal to a second temporal distance (such as TD1), wherein the first temporal distance is represented in terms of a difference between a picture order count value of the current picture and a picture order count value of a first reference picture; and the second temporal distance is represented in terms of a difference between a picture order count value of a second reference picture and the picture order count value of the current picture; and performing no motion vector refinement (DMVR) procedure when it is determined that the first temporal distance (TD0) is not
(Continued)

equal to the second temporal distance (TD1). Thus the DMVR procedure is restricted to only the image block with equal-distance references.

11 Claims, 12 Drawing Sheets

Related U.S. Application Data continuation of application No. PCT/CN2019/105717, filed on Sep. 12, 2019.

(51) Int. Cl.
*H04N 19/159* (2014.01)
*H04N 19/176* (2014.01)
*H04N 19/52* (2014.01)
*H04N 19/70* (2014.01)

(52) U.S. Cl.
CPC .......... *H04N 19/176* (2014.11); *H04N 19/52* (2014.11); *H04N 19/70* (2014.11)

(56) References Cited

U.S. PATENT DOCUMENTS

| | | | |
|---|---|---|---|
| 2018/0184117 A1 | 6/2018 | Chen et al. | |
| 2019/0273931 A1 | 9/2019 | Lim et al. | |
| 2020/0128258 A1 | 4/2020 | Chen et al. | |
| 2020/0366928 A1* | 11/2020 | Liu | H04N 19/176 |
| 2021/0084325 A1* | 3/2021 | Lim | H04N 19/577 |

FOREIGN PATENT DOCUMENTS

| | | |
|---|---|---|
| CN | 106341218 A | 1/2017 |
| CN | 107251457 A | 10/2017 |
| CN | 107360433 A | 11/2017 |
| CN | 109218007 A | 1/2019 |
| EP | 3907998 A1 | 11/2021 |
| KR | 20170131448 A | 11/2017 |
| TW | 201828705 A | 8/2018 |
| TW | 201830968 A | 8/2018 |
| WO | 2017058899 A1 | 4/2017 |
| WO | 2018092870 A1 | 5/2018 |
| WO | 2018113658 A1 | 6/2018 |
| WO | 2018219334 A1 | 12/2018 |

OTHER PUBLICATIONS

Chen, C., et al., "CE9.2.5/9.2.6: DMVR with Template-free Bilateral Matching", Joint Video Experts Team (JVET) of ITU-T SG16 WP3 and ISO/IEC JTC 1/SC 29/WG11 11th Meeting: Ljubljana, SI, Jul. 10-18, 2018, Input Document to JVET, Doc. JVET-K0359v2, pp. 1-5 (Jul. 11, 2018) (Year. 2018).

Chun-Chi Chen et al., "CE9-related: Harmonization between CE9.2.6 (DMVR with Template-free Bilateral Matching, JVET-K0359) and CE9.2.9 (DMVR with Bilateral Matching, JVET-K0217)",oint Video Experts Team (JVET) of ITU-T SG 16 WP 3 and ISO/IEC JTC 1/SC 29/WG 11,11th Meeting: Ljubljana, SI, 10 Jul. 18, 2018, JVET-K0361-v21, total:5pages.

Huanbang Chen et al., "Description of SDR, HDR and 360 video coding technology proposal by Huawei, GoPro, HiSilicon, and Samsung",uJoint Video Exploration Team (JVET) of ITU-T SG 16 WP 3 and ISO/IEC JTC 1/SC 29/WG 11, 10th Meeting: San Diego, US, 10 Apr. 20, 2018, Document: JVET-J0025_v2,total:134pages.

ITU-T H.223(Jul. 2001), Series H: Audiovisual and Multimedia Systems, Infrastructure of audiovisual services-Transmission multiplexing and synchronization, Multiplexing protocol for low bit rate multimedia communication, total 74 pages.

ITU-T H.263(Jan. 2005), Series H: Audiovisual and Multimedia Systems, Infrastructure of audiovisual services-Coding of moving video, Video coding for low bit rate communication, total 226 pages.

ITU-T H.264(Apr. 2017), Series H: Audiovisual and Multimedia Systems, Infrastructure of audiovisual services-Coding of moving video, Advanced video coding for generic audiovisual services, total 812 pages.

ITU-T H.265(Feb. 2018), Series H: Audiovisual and Multimedia Systems Infrastructure of audiovisual services-Coding of moving video, High efficiency video coding, total 692 pages.

JVET-G1001-v1, Jianle Chen et al, Algorithm Description of Joint Exploration Test Model 7 (JEM 7), Joint Video Exploration Team (JVET) of ITU-T SG 16 WP 3 and ISO/IEC JTC 1/SC 29/WG 11, 7th Meeting: Torino, IT, Jul. 13-21, 2017, total 50 pages.

Semih Esenlik et al.,"Description of Core Experiment 9 (CE9): Decoder Side Motion Vector Derivation", oint Video Exploration Team (JVET) of ITU-T SG 16 WP 3 and ISO/IEC JTC 1/SC 29/WG 11,10th Meeting: San Diego, US, 10 Apr. 20, 2018, JVET-J1029_r4, total:34pages.

Semih Esenlik et al., "Simplified DMVR for inclusion in VVC", oint Video Experts Team (JVET) of ITU-T SG 16 WP 3 and ISO/IEC JTC 1/SC 29/WG 11, 12th Meeting: Macao, CN, 3 Oct. 12, 2018, JVET-L0670, total:5pages.

Semih Esenlik, "CE9: DMVR with Bilateral Matching (Test2.9)", Joint Video Experts Team (JVET) of ITU-T SG 16 WP 3 and ISO/IEC JTC 1/SC 29/WG 11, 11th Meeting: Ljubljana, SI, 10 Jul. 18, 2018, JVET-K0217_v1,total:5pages.

Haitao Yang et al., Subblock-Based Motion Derivation and Inter Prediction Refinement in the Versatile VideoCoding Standard, IEEE Transactions On Circuits and Systems for Video Technology, vol. 31, No. 10, Oct. 2021, 16 pages.

* cited by examiner

APPARATUS AND METHOD FOR CONDITIONAL DECODER-SIDE MOTION VECTOR REFINEMENT IN VIDEO CODING

CROSS-REFERENCE TO RELATED APPLICATIONS

This application is a continuation of U.S. patent application Ser. No. 17/249,771, filed on Mar. 12, 2021, which is a continuation of International Application No. PCT/CN2019/105717, filed on Sep. 12, 2019. The International Application claims priority to India Provisional Patent Application No. IN201831034607, filed on Sep. 13, 2018. All of the afore-mentioned patent applications are hereby incorporated by reference in their entireties.

TECHNICAL FIELD

Embodiments of the present disclosure are generally related to video data encoding and decoding techniques, and are especially related to decoder-side motion vector refinement (DMVR) in video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

Embodiments of the present application provide apparatus and method for inter-prediction of a current image block in a current picture of a video, an encoder and a decoder that can perform decoder side motion vector refinement (DMVR) conditionally, and thus the coding efficiency can be improved.

Embodiments of the present application are defined by the features of the independent claims, and further advantageous implementations of the embodiments by the features of the dependent claims.

Particular embodiments are outlined in the attached independent claims, with other embodiments in the dependent claims.

According to a first aspect, the disclosure relates to a method for inter-prediction (bi-prediction) of a current image block in a current picture of a video, the method comprising:

determining whether the current picture is temporally (with regard to time) between a first reference picture (such as RefPic0) and a second reference picture (such as RefPic1) and whether a first temporal distance (such as TD0) and a second temporal distance (such as TD1) are the same distance, wherein the first temporal distance (TD0) is between the current picture and the first reference picture (RefPic0), and the second temporal distance (TD1) is between the current picture and the second reference picture (RefPic1); and performing motion vector refinement (DMVR) procedure to obtain a position of a first refined reference block and a position of a second refined reference block and determining a prediction block (predicted sample values) of the current image block based on the position of the first refined reference block and the position of the second refined reference block, when it is determined that the current picture is temporally between the first reference picture (such as RefPic0) and the second reference picture (such as RefPic1) and that the first temporal distance (TD0) and the second temporal distance (TD1) are the same distance.

It is noted that "when it is determined that the current picture is temporally between the first reference picture (such as RefPic0) and the second reference picture (such as RefPic1) and that the first temporal distance (TD0) and the second temporal distance (TD1) are the same distance" should not be understood as "only when it is determined that the current picture is temporally between the first reference picture (such as RefPic0) and the second reference picture (such as RefPic1) and that the first temporal distance (TD0) and the second temporal distance (TD1) are the same distance". Other conditions can also be considered when determining whether to perform motion vector refinement (DMVR) procedure.

Regarding "a position of a first refined reference block and a position of a second refined reference block", the position can be an absolute position, which is the position in the reference picture, or a relative position which is a position offset based on the position of the initial reference block.

It is noted that DMVR is applied for the merge mode of bi-prediction with one motion vector (MV) from a reference picture in the past and another MV from another reference picture in the future. The reference pictures may be two pictures in temporally different directions with respect to the current picture that contains the current image block. The present disclosure is not applicable to the scenario in which both predictions come from the same time direction (either both from the past or both from the future).

In an embodiment, the determining whether the current picture is temporally between a first reference picture (such as RefPic0) and a second reference picture (such as RefPic1) and that a first temporal distance (such as TD0) and a second temporal distance (such as TD1) is the same distance, wherein the first temporal distance (TD0) is between the current picture and the first reference picture (RefPic0), and the second temporal distance (TD1) is between the current picture and the second reference picture (RefPic1), comprises:

|TD0|==|TD1|

AND

TD0*TD1<0

For each merge candidate which indicates bi-direction, compute TD0 and TD1 as temporal distances of L0 and L1 reference picture from the current picture. The TD0 and TD1 may be calculated by using a picture order count (POC). For example:

$$TD0 = POCc - POC_0$$

$$TD1 = POCc - POC_1$$

Here, POCc, $POC_0$, and $POC_1$ represent POC of the current picture, POC of the first reference picture, and POC of the second reference picture, respectively.

In an embodiment, the method further comprises: performing motion compensation using a first initial motion vector (MV0) and a second initial motion vector (MV1), when it is determined that the first temporal distance (TD0) and the second temporal distance (TD1) are different distance or that the current picture is not temporally between the first reference picture (such as RefPic0) and the second reference picture (such as RefPic1); in one example, performing motion compensation using a first initial motion vector (MV0) and a second initial motion vector (MV1) when $|TD0| \neq |TD1|$ or $TD0*TD1 >= 0$ in the case that $TD0 = POCc - POC_0$, and $TD1 = POCc - POC_1$. Alternatively, in another example, performing motion compensation using a first initial motion vector (MV0) and a second initial motion vector (MV1), when $TD0 \neq TD1$ in the case that $TD0 = POCc - POC_0$, and $TD1 = POC_1 - POCc$.

In an embodiment, the method further comprising: obtaining an initial motion information of the current image block in the current picture, wherein the initial motion information comprises the first initial motion vector, a first reference index, the second initial motion vector and a second reference index, wherein the first reference index indicates the first reference picture, and the second reference index indicates the second reference picture.

In an embodiment, the operation of performing motion vector refinement (DMVR) procedure, comprises:

determining a first initial reference block in a first reference picture based on the first initial motion vector;

determining a second initial reference block in a second reference picture based on the second initial motion vector;

generating a bilateral reference block based on the first initial reference block and the second initial reference block; for example, the bilateral reference block may be referred as bilateral template, and the template has the shape and size of the image prediction block;

comparing a cost between the bilateral reference block and each of a plurality of first reference blocks in the first reference picture to determine a position of a first refined reference block or a first refined motion vector; and comparing a cost between the bilateral reference block and each of a plurality of second reference blocks in the second reference picture to determine a position of a second refined reference block or a second refined motion vector.

In an embodiment, the operation of performing motion vector refinement (DMVR) procedure, comprises:

obtaining a template for the current image block based on a first initial reference block pointed to by the first initial motion vector in the first reference picture (such as RefPic0) and a second initial reference block pointed to by the second initial motion vector in the second reference picture (such as RefPic1); and determining the first refined motion vector and the second refined motion vector by template matching with said template in a first search space and a second search space respectively, the first search space containing a position given by the first initial motion vector and the second search space containing a position given by the second initial motion vector.

In an embodiment, the operation of performing motion vector refinement (DMVR) procedure, comprises:

determining a pair of best-matching blocks pointed to by best motion vectors from a plurality of pairs of reference blocks based on the matching cost criterion (for example, based on the matching cost of each pair of reference blocks), wherein said pair of reference blocks includes a first reference block in a sample region that is of the first reference picture and that is determined based on the first initial motion vector and a second reference block in a sample region that is of the second reference picture and that is determined based on the second initial motion vector;

wherein the best motion vectors include the first refined motion vector and the second refined motion vector.

In an embodiment, the operation of performing motion vector refinement (DMVR) procedure to obtain a position of a first refined reference block and a position of a second refined reference block, comprises:

determining positions of N first reference blocks and positions of N second reference blocks based on the first initial motion vector, the second initial motion vector and a position of the current image block, wherein the N first reference blocks are included in the first reference image, and the N second reference blocks are included in the second reference image, and N is an integer greater than 1; and determining positions of a pair of reference blocks from the positions of the M pairs of reference blocks as a position of the first refined reference block and a position of the second refined reference block based on the matching cost criterion, wherein positions of each pair of reference blocks include a position of a first reference block and a position of a second reference block, and for each pair of reference blocks, the first position offset (delta0x, delta0y) and the second position offset (delta1x, delta1y) are mirrored, and the first position offset (delta0x, delta0y) represents an offset of the position of the first reference block relative to the position of the first initial reference block, and the second position offset (delta1x, delta1y) represents an offset of the position of the second reference block relative to the position of the second initial reference block, wherein M is an integer greater than or equal to 1, and M is less than or equal to N.

In an example, the expression that the first position offset (delta0x, delta0y) and the second position offset (delta1x, delta1y) are mirrored, may be understood as: the direction of the first position offset is opposite to the direction of the second position offset, and the magnitude of the first position offset is the same as the magnitude of the second position offset.

In an embodiment, wherein the operation of determining a prediction block of the current image block based on the position of the first refined reference block and the position of the second refined reference block, comprises:

determining a prediction block based on the first refined reference block and the second refined reference block, wherein the first refined reference block is determined in the first reference picture based on the position of the first refined reference block and the second refined reference block is determined in the second reference picture based on the position of the second refined reference block; or determining a prediction block based on the first refined reference block and a second refined reference block, wherein the first refined reference block and the second refined reference block are determined by performing motion compensation using the first refined motion vector and the second refined motion vector.

In an embodiment, wherein the first reference picture is a reference image temporally preceding the current picture and the second reference picture is a reference image preceded temporally by the current picture; or the first reference picture is a reference image preceded temporally by the current picture and the second reference picture is a reference image temporally preceding the current picture; or wherein the first reference picture is a reference image in the past and the second reference picture is a reference image in the future; or the first reference picture is a reference image in the future and the second reference picture is a reference image in the past.

In other words, a previous picture of the current picture is the first reference picture, and a next image of the current picture is the second reference picture; or a previous picture of the current picture is the second reference picture, and a next image of the current picture is the first reference picture.

In an embodiment, wherein the first temporal distance (TD0) indicates the picture order count (POC) distance between the current picture and the first reference picture, and the second temporal distance (TD1) indicates the POC distance between the current picture and the second reference picture; or wherein the first temporal distance (TD0) is represented in terms of difference between the picture order count value (POCc) of the current picture and the picture order count value (POC0) of the first reference image; and the second temporal distance (TD1) is represented in terms of difference between the picture order count value (POCc) of the current picture and the picture order count value (POC1) of the second reference image.

In an embodiment, wherein the operation of determining whether the current picture is temporally between a first reference picture (such as RefPic0) and a second reference picture (such as RefPic1), comprises:

determining whether the picture order count value (POCc) of the current picture is larger than the picture order count value (POC0) of the first reference image and picture order count value (POCc) of the current picture is smaller than the picture order count value (POC1) of the second reference image, or whether the picture order count value (POCc) of the current picture is smaller than the picture order count value (POC0) of the first reference image and picture order count value (POCc) of the current picture is larger than the picture order count value (POC1) of the second reference image.

According to a second aspect, the disclosure relates to a method for inter-prediction (bi-prediction) of a current image block in a current picture of a video, the method comprising: determining whether the current picture is temporally between a first reference picture (such as RefPic0) and a second reference picture (such as RefPic1) and whether a first temporal distance (such as TD0) and a second temporal distance (such as TD1) are the same distance, wherein the first temporal distance (TD0) is between the current picture and the first reference picture (RefPic0), and the second temporal distance (TD1) is between the current picture and the second reference picture (RefPic1); and performing motion compensation using a first initial motion vector (MV0) and a second initial motion vector (MV1), when it is determined that the first temporal distance (TD0) and the second temporal distance (TD1) are different distance or that the current picture is not temporally between the first reference picture (such as RefPic0) and the second reference picture (such as RefPic1).

In an embodiment, wherein initial motion information of the current image block comprises the first initial motion vector, a first reference index, the second initial motion vector and a second reference index, wherein the first reference index indicates the first reference picture, and the second reference index indicates the second reference picture.

In an embodiment, wherein the first temporal distance indicates a picture order count (POC) distance between the current picture and the first reference picture, and the second temporal distance indicates a POC distance between the current picture and the second reference picture; or wherein the first temporal distance (TD0) is represented in terms of difference between a picture order count value (POCc) of the current picture and a picture order count value (POC0) of the first reference image; and the second temporal distance (TD1) is represented in terms of difference between the picture order count value (POCc) of the current picture and a picture order count value (POC1) of the second reference image.

According to a third aspect, the disclosure relates to a method for inter-prediction (bi-prediction) of a current image block in a current picture of a video, the method comprising: determining whether a first temporal distance (such as TD0) is equal to a second temporal distance (such as TD1), wherein the first temporal distance (TD0) is represented in terms of difference between the picture order count value (POCc) of the current picture and the picture order count value (POC0) of the first reference image; and the second temporal distance (TD1) is represented in terms of difference between the picture order count value (POC1) of the second reference image and the picture order count value (POCc) of the current picture; and performing motion vector refinement (DMVR) procedure to determine a prediction block of the current image block, when it is determined that the first temporal distance (TD0) is equal to the second temporal distance (TD1).

In an embodiment, the method further comprises: performing motion compensation using a first initial motion vector and a second initial motion vector to determine a prediction block of the current image block, when it is determined that the first temporal distance is not equal to the second temporal distance.

According to a fourth aspect, the disclosure relates to a method for inter-prediction (bi-prediction) of a current image block in a current picture of a video, the method comprising:

determining whether a first temporal distance (such as TD0) is equal to a second temporal distance (such as TD1), wherein the first temporal distance (TD0) is represented in terms of difference between the picture order count value (POCc) of the current picture and the picture order count value (POC0) of the first reference image; and the second temporal distance (TD1) is represented in terms of difference between the picture order count value (POC1) of the second reference image and the picture order count value (POCc) of the current picture; and performing no motion vector refinement (DMVR) procedure (or disabling motion vector refinement (DMVR) procedure), when it is determined that the first temporal distance (TD0) is not equal to the second temporal distance (TD1).

For each merge candidate which indicates bi-direction, the TD0 and TD1 may be calculated by using a picture order count (POC). For example:

$TD0 = POCc - POC_0$ $TD1 = POC_1 - POCc$

Here, POCc, $POC_0$, and $POC_1$ represent POC of the current picture, POC of the first reference picture, and POC of the second reference picture respectively.

In an embodiment, wherein the first reference picture is a reference image temporally preceding the current picture and the second reference picture is a reference image preceded temporally by the current picture; or the first reference picture is a reference image preceded temporally by the current picture and the second reference picture is a reference image temporally preceding the current picture; or wherein the first reference picture is a reference image in the past and the second reference picture is a reference image in the future; or the first reference picture is a reference image in the future and the second reference picture is a reference image in the past.

In other words, a previous picture of the current picture is the first reference picture, and a next image of the current picture is the second reference picture; or a previous picture of the current picture is the second reference picture, and a next image of the current picture is the first reference picture.

According to a fifth aspect, the disclosure relates to a method for encoding a video image comprising:

performing inter-prediction of a current image block in a current picture of the video to obtain a prediction block of the current image block according to the above method; and encoding difference (e.g. residual or residual block) between the current image block and the prediction block and generating a bitstream including the encoded difference and an index (such as a merge candidate index) for indicating an initial motion information, wherein the initial motion information comprises a first initial motion vector and a second initial motion vector.

According to a sixth aspect, the disclosure relates to a method for decoding a video image from a bitstream comprising:

parsing from the bitstream an index (such as a merge candidate index) for indicating an initial motion information and an encoded difference (e.g. residual or residual block) between a current image block and a prediction block of the current image block, wherein the initial motion information comprises a first initial motion vector and a second initial motion vector;

performing inter-prediction of a current image block in a current picture of the video to obtain a prediction block of the current image block according to the method previously described above; and reconstructing the current image block as a sum of the parsed difference and the prediction block.

According to a seventh aspect, the disclosure relates to a method of encoding implemented by an encoding device, comprising:

determining value of a syntax element indicating whether the above method is enabled or not; and generating a bitstream including the syntax element.

In an embodiment, wherein the syntax element is signaled at any one of a sequence parameter set (SPS) level, a picture parameter set (PPS) level, a slice header, coding tree unit (CTU) syntax, or coding unit (CU) syntax.

In an embodiment, wherein the syntax element comprises a first flag (such as sps_conditional_dmvr_flag) and/or a second flag (such as pps_conditional_dmvr_flag);

If the first flag (sps_conditional_dmvr_flag) is equal to 0, the method previously described above is not performed for the image blocks of the sequence;

If the first flag (sps_conditional_dmvr_flag) is equal to 1 and the second flag (pps_conditional_dmvr_flag) is equal to 0, the method previously described above is not performed for the image blocks of the picture of the sequence; or If the first flag (sps_conditional_dmvr_flag) is equal to 1 and the second flag (pps_conditional_dmvr_flag) is equal to 1, the method previously described above is performed for the image blocks of the picture of the sequence.

According to an eighth aspect, the disclosure relates a method of decoding implemented by a decoding device, comprising:

parsing from a bitstream a syntax element indicating whether the previously described above method is enabled or not; and adaptively enabling or disabling decoder-side motion vector refinement (DMVR) procedure according to the syntax element indicating whether the above method is enabled or not.

In an embodiment, wherein the syntax element is obtained from any one of a sequence parameter set (SPS) level of a bitstream, a picture parameter set (PPS) level of the bitstream, a slice header, coding tree unit (CTU) syntax, or coding unit (CU) syntax.

In an embodiment, wherein the syntax element comprises the first flag (sps_conditional_dmvr_flag) and the second flag (pps_conditional_dmvr_flag);

If the first flag (sps_conditional_dmvr_flag) is equal to 0, the method previously described above is not performed for the image blocks of the sequence;

If the first flag (sps_conditional_dmvr_flag) is equal to 1 and the second flag (pps_conditional_dmvr_flag) is equal to 0, the method previously described above is not performed for the image blocks of the picture of the sequence; or If the first flag (sps_conditional_dmvr_flag) is equal to 1 and the second flag (pps_conditional_dmvr_flag) is equal to 1, the method previously described above is performed for the image blocks of the picture of the sequence.

According to a ninth aspect, the disclosure relates a coding device, comprising:

a memory storing instructions; and a processor coupled to the memory, the processor configured to execute the instructions stored in the memory to cause the processor to perform the previously shown method.

According to a tenth aspect, the disclosure relates an apparatus for inter-prediction of a current image block in a current picture of a video, comprising:

a determining unit configured to determine whether the current picture is temporally between a first reference picture (such as RefPic0) and a second reference picture (such as RefPic1) and whether a first temporal distance (such as TD0) and a second temporal distance (such as TD1) are the same distance, wherein the first temporal distance (TD0) is between the current picture and the first reference picture (RefPic0), and the second temporal distance (TD1) is between the current picture and the second reference picture (RefPic1); and an inter prediction processing unit configured to perform motion vector refinement (DMVR) procedure to obtain a position of a first refined reference block and a position of a second refined reference block and to determine a prediction block of the current image block based on the position of the first refined reference block and the position of the second refined reference block, when it is determined that the current picture is temporally between the first reference picture (such as RefPic0) and the second reference picture (such as RefPic1) and that the first temporal distance (TD0) and the second temporal distance (TD1) are the same distance.

In an embodiment, the determining unit is configured to determine whether the current picture is temporally between a first reference picture (such as RefPic0) and a second reference picture (such as RefPic1) and whether a first temporal distance (such as TD0) and a second temporal distance (such as TD1) are the same distance through the following equation:

$$|TD0|==|TD1|$$

AND $$TD0*TD1<0$$

For each merge candidate which indicates bi-direction, compute TD0 and TD1 as temporal distances of L0 and L1 reference picture from the current picture. The TD0 and TD1 may be calculated by using a picture order count (POC). For example:

$$TD0=POCc-POC_0$$

$$TD1=POCc-POC_1$$

Here, POCc, $POC_0$, and $POC_1$ represent POC of the current picture, POC of the first reference picture, and POC of the second reference picture, respectively.

In an embodiment, wherein the inter prediction processing unit is further configured to perform motion compensation using a first initial motion vector (MV0) and a second initial motion vector (MV1), when it is determined that the first temporal distance (TD0) and the second temporal distance (TD1) are different distance or that the current picture is not temporally between the first reference picture (such as RefPic0) and the second reference picture (such as RefPic1). In one example, the inter prediction processing unit is further configured to perform motion compensation using a first initial motion vector (MV0) and a second initial motion vector (MV0), when $|TD0|\neq|TD1|$ or $TD0*TD1>=0$ in the case that $TD0=POCc-POC_0$, and $TD1=POCc-POC_1$. Alternatively, in another example, the inter prediction processing unit is further configured to perform motion compensation using a first initial motion vector (MV0) and a second initial motion vector (MV1), when $TD0\neq TD1$ in the case that $TD0=POCc-POC_0$, and $TD1=POC_1-POCc$.

In an embodiment, wherein the inter prediction processing unit is further configured to obtain an initial motion information of the current image block in the current picture, wherein the initial motion information comprises the first initial motion vector, a first reference index, the second initial motion vector and a second reference index, wherein the first reference index indicates the first reference picture, and the second reference index indicates the second reference picture.

In an embodiment, for the performing motion vector refinement (DMVR) procedure to obtain a position of a first refined reference block and a position of a second refined reference block, wherein the inter prediction processing unit is specifically configured to:

determine a first initial reference block in a first reference picture based on the first initial motion vector;

determine a second initial reference block in a second reference picture based on the second initial motion vector;

generate a bilateral reference block based on the first initial reference block and the second initial reference block;

compare a cost between the bilateral reference block and each of a plurality of first reference blocks in the first reference picture to determine a position of a first refined reference block or a first refined motion vector; and compare a cost between the bilateral reference block and each of a plurality of second reference blocks in the second reference picture to determine a position of a second refined reference block or a second refined motion vector.

In an embodiment, for performing motion vector refinement (DMVR) procedure to obtain a position of a first refined reference block and a position of a second refined reference block, wherein the inter prediction processing unit is specifically configured to:

obtain a template for the current image block based on a first initial reference block pointed to by the first initial motion vector in the first reference picture (such as RefPic0) and a second initial reference block pointed to by the second initial motion vector in the second reference picture (such as RefPic1); and determine the first refined motion vector and the second refined motion vector by template matching with said template in a first search space and a second search space respectively, wherein the first search space is located on a position given by the first initial motion vector and the second search space is located on a position given by the second initial motion vector.

In an embodiment, for the performing motion vector refinement (DMVR) procedure to obtain a position of a first refined reference block and a position of a second refined reference block, wherein the inter prediction processing unit is specifically configured to:

determine a pair of best-matching blocks pointed to by best motion vectors from a plurality of pairs of reference blocks based on the matching cost criterion (for example, based on the matching cost of each pair of reference blocks), wherein said pair of reference blocks includes a first reference block in a sample region that is of the first reference picture and that is determined based on the first initial motion vector and a second reference block in a sample region that is of the second reference picture and that is determined based on the second initial motion vector;

wherein the best motion vectors include the first refined motion vector and the second refined motion vector.

In an embodiment, for the performing motion vector refinement (DMVR) procedure to obtain a position of a first refined reference block and a position of a second refined reference block, wherein the inter prediction processing unit is specifically configured to:

determine positions of N first reference blocks and positions of N second reference blocks based on the first initial motion vector, the second initial motion vector and a position of the current image block, wherein the N first reference blocks are included in the first reference image, and the N second reference blocks are included in the second reference image, and N is an integer greater than 1; and determine positions of a pair of reference blocks from the positions of the M pairs of reference blocks as a position of the first refined reference block and a position of the second refined reference block based on the matching cost criterion, wherein positions of each pair of reference blocks includes a position of a first reference block and a position of a second reference block, and for each pair of reference blocks, the first position offset (delta0x, delta0y) and the second position offset (delta1x, delta1y) are mirrored, and the first position offset (delta0x, delta0y) represents an offset of the position of the first reference block relative to the position of the first initial reference block, and the second position offset (delta1x, delta1y) represents an offset of the position of the second reference block relative to the position of the second initial reference block, wherein M is an integer greater than or equal to 1, and M is less than or equal to N.

In an embodiment, wherein for the determining a prediction block of the current image block based on the position of the first refined reference block and the position of the second refined reference block, wherein the inter prediction processing unit is specifically configured to:

determine a prediction block based on the first refined reference block and the second refined reference block, wherein the first refined reference block is determined in the first reference picture based on the position of the first refined reference block and the second refined reference block is determined in the second reference picture based on the position of the second refined reference block; or determine a prediction block based on the first refined reference block and a second refined reference block, wherein the first refined reference block and the second refined reference block are determined by performing motion compensation using the first refined motion vector and the second refined motion vector.

In an embodiment, wherein the first reference picture is a reference image temporally preceding the current picture and the second reference picture is a reference image preceded temporally by the current picture; or the first reference picture is a reference image preceded temporally by the current picture and the second reference picture is a reference image temporally preceding the current picture; or wherein the first reference picture is a reference image in the past and the second reference picture is a reference image in the future; or the first reference picture is a reference image in the future and the second reference picture is a reference image in the past.

In an embodiment, wherein the first temporal distance (TD0) indicates the picture order count (POC) distance between the current picture and the first reference picture, and the second temporal distance (TD1) indicates the POC distance between the current picture and the second reference picture; or wherein the first temporal distance (TD0) is represented in terms of difference between the picture order count value (POCc) of the current picture and the picture order count value (POC0) of the first reference image; and the second temporal distance (TD1) is represented in terms of difference between the picture order count value (POCc) of the current picture and the picture order count value (POC1) of the second reference image.

In an embodiment, wherein for the determining whether the current picture is temporally between a first reference picture (such as RefPic0) and a second reference picture (such as RefPic1), wherein the inter prediction processing unit is specifically configured to:

determine whether the picture order count value (POCc) of the current picture is larger than the picture order count value (POC0) of the first reference image and picture order count value (POCc) of the current picture is smaller than the picture order count value (POC1) of the second reference image, or whether the picture order count value (POCc) of the current picture is smaller than the picture order count value (POC0) of the first reference image and picture order count value (POCc) of the current picture is larger than the picture order count value (POC1) of the second reference image.

According to an eleventh aspect, the disclosure relates an encoding apparatus for encoding a video image, the encoding apparatus comprising:

a determining unit configured to determine whether the current picture is temporally between a first reference picture and a second reference picture and whether a first temporal distance and a second temporal distance are the same distance, wherein the first temporal distance is between the current picture and the first reference picture, and the second temporal distance is between the current picture and the second reference picture; and an inter prediction processing unit configured to perform motion compensation using a first initial motion vector and a second initial motion vector to determine a prediction block of the current image block, when it is determined that the first temporal distance and the second temporal distance are different distance or that the current picture is not temporally between the first reference picture and the second reference picture.

In an embodiment, wherein initial motion information of the current image block comprises the first initial motion vector, a first reference index, the second initial motion vector and a second reference index, wherein the first reference index indicates the first reference picture, and the second reference index indicates the second reference picture.

In an embodiment, wherein the first temporal distance indicates a picture order count (POC) distance between the current picture and the first reference picture, and the second temporal distance indicates a POC distance between the current picture and the second reference picture; or wherein the first temporal distance (TD0) is represented in terms of difference between a picture order count value (POCc) of the current picture and a picture order count value (POC0) of the first reference image; and the second temporal distance (TD1) is represented in terms of difference between the picture order count value (POCc) of the current picture and a picture order count value (POC1) of the second reference image.

According to a twelfth aspect, the disclosure relates an encoding apparatus for encoding a video image, the encoding apparatus comprising:

the previously shown apparatus for obtaining a prediction block of a current image block, an entropy coding unit configured to encoding difference (such as residual) between the current image block and the prediction block of the current image block and generating a bitstream including the encoded difference and an index (such as merge candidate index) for indicating initial motion information, wherein the initial motion information comprises a first initial motion vector and a second initial motion vector.

According to a thirteenth aspect, the disclosure relates a decoding apparatus for decoding a video image from a bitstream, the apparatus comprising:

an entropy decoding unit configured to parse from the bitstream an index for indicating an initial motion information and an encoded difference (such as residual) between a current image block and a prediction block of the current image block, wherein the initial motion information comprises a first initial motion vector and a second initial motion vector;

the previously shown apparatus for obtaining the prediction block of the current image block, and an image reconstruction unit configured to reconstruct the current image block as a sum of the parsed difference (such as residual) and the prediction block.

According to a fourteenth aspect, the disclosure relates an encoding device, comprising one or more processing circuitry configured to:

determine a value of a syntax element indicating whether the previously shown method is enable or not; and generate a bitstream including the syntax element.

In an embodiment, wherein the syntax element is signaled at any one of a sequence parameter set (SPS) level, a picture parameter set (PPS) level, a slice header, coding tree unit (CTU) syntax, or coding unit (CU) syntax.

In an embodiment, wherein the syntax element comprises the first flag (sps_conditional_dmvr_flag) and the second flag (pps_conditional_dmvr_flag);

if the first flag (sps_conditional_dmvr_flag) is equal to 0, the previously shown method is not performed for the image blocks of the sequence;

if the first flag (sps_conditional_dmvr_flag) is equal to 1 and the second flag (pps_conditional_dmvr_flag) is equal to 0, the previously shown method is not performed for the image blocks of the picture of the sequence; or if the first flag (sps_conditional_dmvr_flag) is equal to 1 and the second flag (pps_conditional_dmvr_flag) is equal to 1, the previously shown method 1 is performed for the image blocks of the picture of the sequence.

According to a fifteenth aspect, the disclosure relates a decoding device, comprising one or more processing circuitry configured to:

parse from a bitstream a syntax element for indicating whether the previously shown method is enable or not; and adaptively enabling or disabling a decoder-side motion vector refinement (DMVR) procedure according to the syntax element.

In an embodiment, wherein the syntax element is obtained from any one of a sequence parameter set (SPS) level of a bitstream, a picture parameter set (PPS) level of the bitstream, a slice header, coding tree unit (CTU) syntax, or coding unit (CU) syntax.

In an embodiment, wherein the syntax element comprises the first flag (sps_conditional_dmvr_flag) and the second flag (pps_conditional_dmvr_flag);

if the first flag (sps_conditional_dmvr_flag) is equal to 0, the previously shown method is not performed for the image blocks of the sequence;

if the first flag (sps_conditional_dmvr_flag) is equal to 1 and the second flag (pps_conditional_dmvr_flag) is equal to 0, the previously shown method is not performed for the image blocks of the picture of the sequence; or if the first flag (sps_conditional_dmvr_flag) is equal to 1 and the second flag (pps_conditional_dmvr_flag) is equal to 1, the previously shown method is performed for the image blocks of the picture of the sequence.

According to a sixteenth aspect, the disclosure relates computer-readable medium storing computer-readable instructions which when executed on a processor perform the operations according to the previously shown methods.

According to a seventeenth aspect, the disclosure relates a method for inter-prediction of a current image block in a current picture of a video, the method comprising:

determining, whether at least one condition is met, wherein the at least one condition comprises: a first temporal distance (such as TD0) is equal to a second temporal distance (such as TD1), wherein the first temporal distance is represented in terms of difference between the picture order count value of the current picture and the picture order count value of the first reference image; and the second temporal distance is represented in terms of difference between the picture order count value of the second reference image and the picture order count value of the current picture; and performing, when the at least one condition is met, decoder side motion vector refinement (DMVR) procedure to determine a prediction block of the current image block.

According to an eighteenth aspect, the disclosure relates a method for inter-prediction of a current image block in a current picture of a video, the method comprising:

performing, when one or more conditions are met, motion vector refinement (DMVR) procedure to obtain a first refined motion vector and a second refined motion vector for a sub-block of the current image block, wherein the first refined motion vector corresponds to a first reference picture and the second refined motion vector corresponds to a second reference picture; and determining a prediction block (such as predicted sample values) of the current image block, wherein the prediction block of the current image block comprises a prediction block of the sub-block, wherein the prediction block of the sub-block is determined based at least in part upon the first refined motion vector and the second refined motion vector;

wherein the one or more conditions at least comprises:

a first temporal distance (such as TD0) is equal to a second temporal distance (such as TD1), wherein the first temporal distance (TD0) is represented in terms of difference between the picture order count value (POCc) of the current picture and the picture order count value (POC0) of the first reference image; and the second temporal distance (TD1) is represented in terms of difference between the picture order count value (POCc) of the second reference picture and the picture order count value (POC1) of the current image.

In an embodiment, wherein the first reference picture is a reference image temporally preceding the current picture and the second reference picture is a reference image preceded temporally by the current picture; or the first reference picture is a reference image preceded temporally by the current picture and the second reference picture is a reference image temporally preceding the current picture; or wherein the first reference picture is a reference image in the past and the second reference picture is a reference image in the future; or the first reference picture is a reference image in the future and the second reference picture is a reference image in the past.

The method according to some aspect of the disclosure can be performed by the apparatus according to the some aspect of the disclosure. Further features and implementation forms of the method according to the some aspect of the disclosure result directly from the functionality of the apparatus according to the some aspect of the disclosure and its different implementation forms.

It is noted that a coding device may be encoding device or decoding device.

According to another aspect, an embodiment relates to an apparatus for decoding a video stream includes a processor and a memory. The memory is storing instructions that cause the processor to perform the previously shown method.

According to another aspect, an embodiment relates to an apparatus for encoding a video stream includes a processor and a memory. The memory is storing instructions that cause the processor to perform the previously shown method.

According to another aspect, a computer-readable storage medium having stored thereon instructions that when executed cause one or more processors configured to code video data is proposed. The instructions cause the one or more processors to perform a previously shown method.

According to another aspect, a computer program product with a program code for performing the previously shown method when the computer program runs on a computer, is provided.

Details of one or more embodiments are set forth in the accompanying drawings and the description below. Other features, objects, and advantages will be apparent from the description, drawings, and claims.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Definitions of Acronyms & Glossaries

Figure 1:
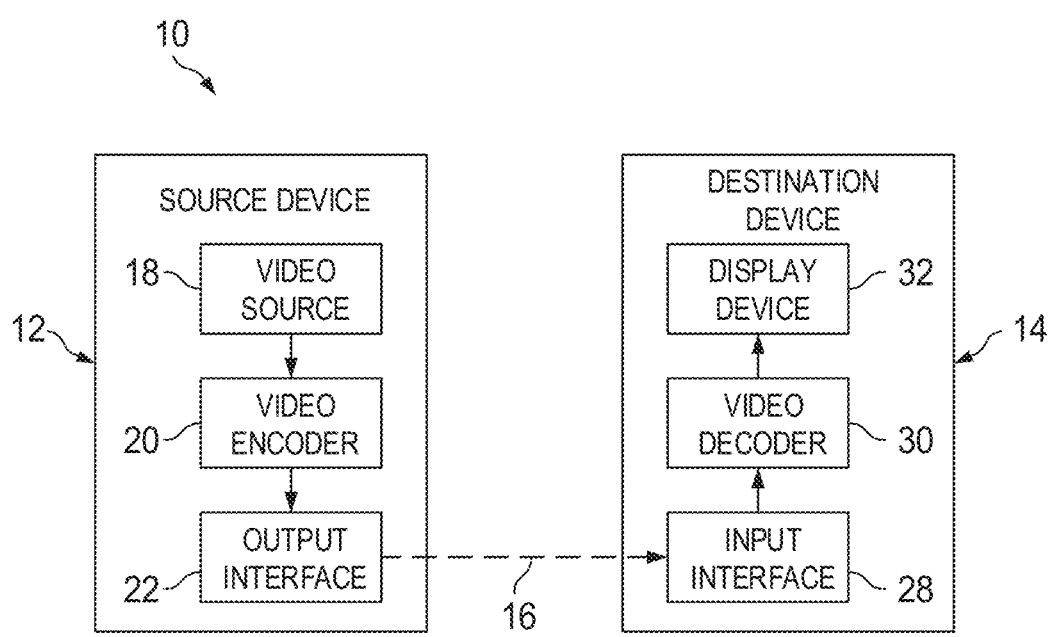
FIG. 1 is a block diagram illustrating an example coding system that may utilize conditional decoder-side motion vector refinement techniques according to an embodiment.

DMVR Decoder Side Motion Vector Refinement
SAD Sum of Absolute Differences
MV Motion Vector
MCP Motion Compensated Prediction
HEVC High Efficient Video Coding FIG. 1 is a block diagram illustrating an example coding system 10 that may utilize bidirectional prediction techniques. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 and/or the video decoder 30 of the destination device 14 may be configured to apply the techniques for bidirectional prediction. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for bidirectional prediction may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Motion Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
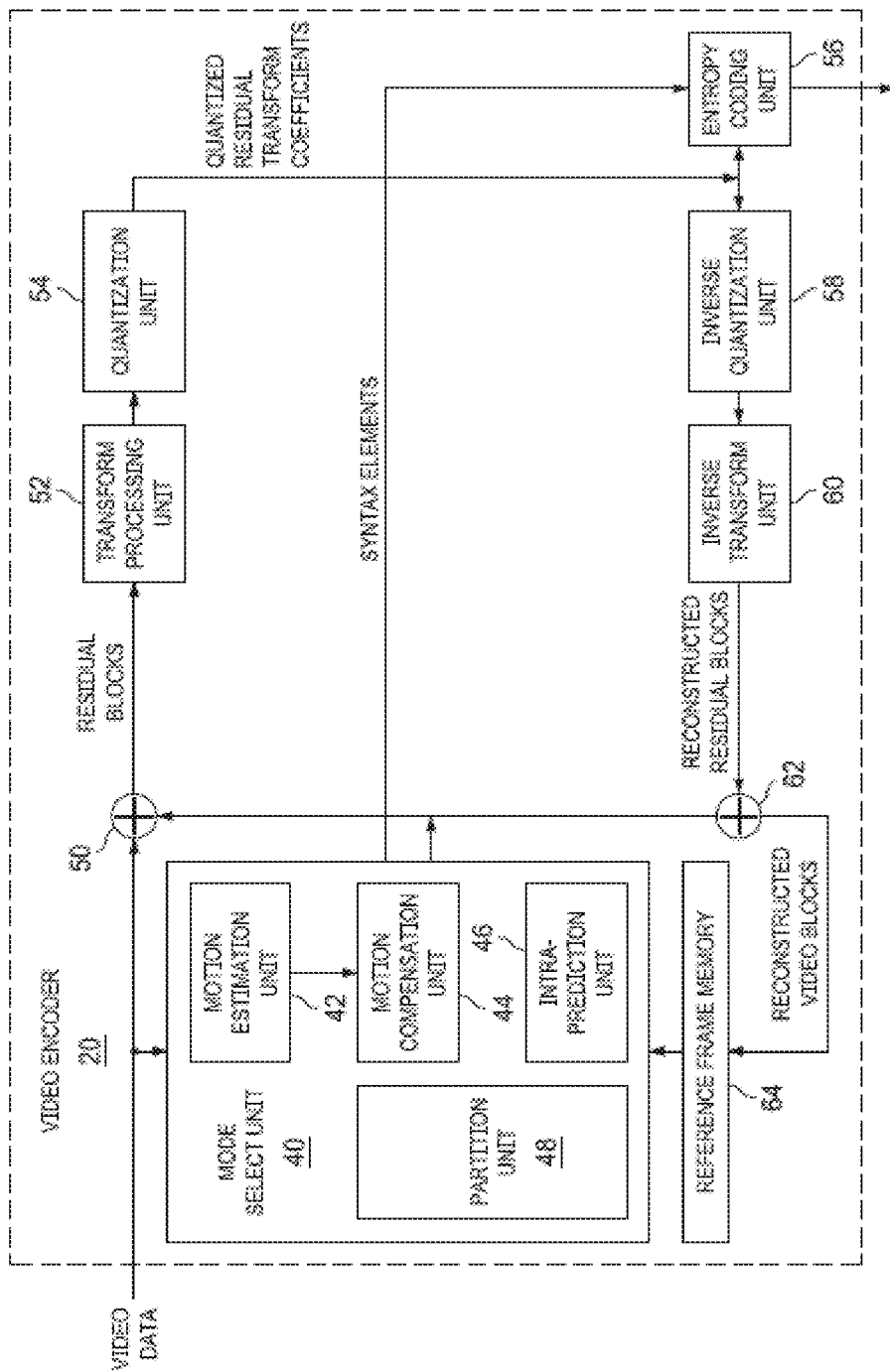
FIG. 2 is a block diagram illustrating an example video encoder that may implement conditional decoder-side motion vector refinement techniques according to an embodiment.

FIG. 2 is a block diagram illustrating an example of video encoder 20 that may implement bidirectional prediction techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quadtree data structure indicative of partitioning of a LCU into sub-CUs. Leaf-node CUs of the quadtree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. In an embodiment, a CU, PU, or TU can be square or non-square (e.g., rectangular) in shape.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Other structural variations of the video encoder 20 can be used to encode the video stream. For example, a non-transform based encoder 20 can quantize the residual signal directly without the transform processing unit 52 for certain blocks or frames. In another implementation, an encoder 20 can have the quantization unit 54 and the inverse quantization unit 58 combined into a single unit.

Figure 3:
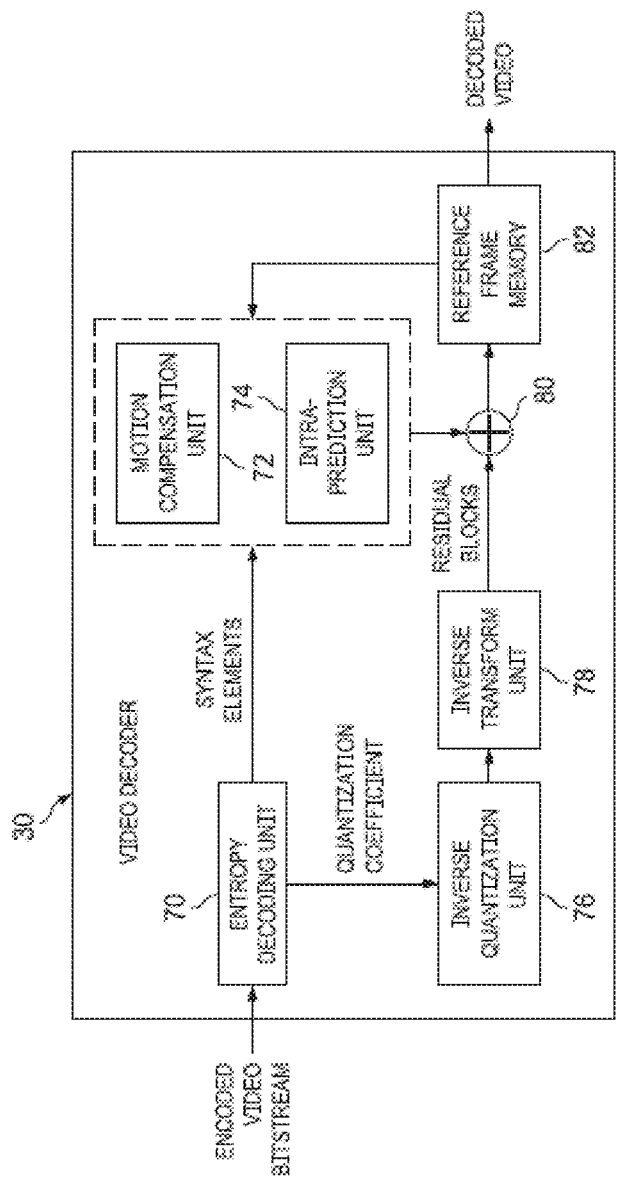
FIG. 3 is a block diagram illustrating an example of a video decoder that may implement conditional decoder-side motion vector refinement techniques according to an embodiment.

FIG. 3 is a block diagram illustrating an example of video decoder 30 that may implement bidirectional prediction techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

As will be appreciated by those in the art, the coding system 10 of FIG. 1 is suitable for implementing various video coding or compression techniques. Some video compression techniques, such as inter prediction, intra prediction, and loop filters, have demonstrated to be effective. Therefore, the video compression techniques have been adopted into various video coding standards, such as H.264/AVC and H.265/HEVC.

Various coding tools such as adaptive motion vector prediction (AMVP) and merge mode (MERGE) are used to predict motion vectors (MVs) and enhance inter prediction efficiency and, therefore, the overall video compression efficiency.

The MVs noted above are utilized in bi-prediction. In a bi-prediction operation, two prediction blocks are formed. One prediction block is formed using a MV of list0 (referred to herein as MV0). Another prediction block is formed using a MV of list1 (referred to herein as MV1). The two prediction blocks are then combined (e.g., averaged) in order to form a single prediction signal (e.g., a prediction block or a predictor block).

Other variations of the video decoder 30 can be used to decode the compressed bitstream. For example, the decoder 30 can produce the output video stream without the loop filtering unit. For example, a non-transform based decoder 30 can inverse-quantize the residual signal directly without the inverse-transform processing unit 78 for certain blocks or frames. In another implementation, the video decoder 30 can have the inverse-quantization unit 76 and the inverse-transform processing unit 78 combined into a single unit.

Figure 5:
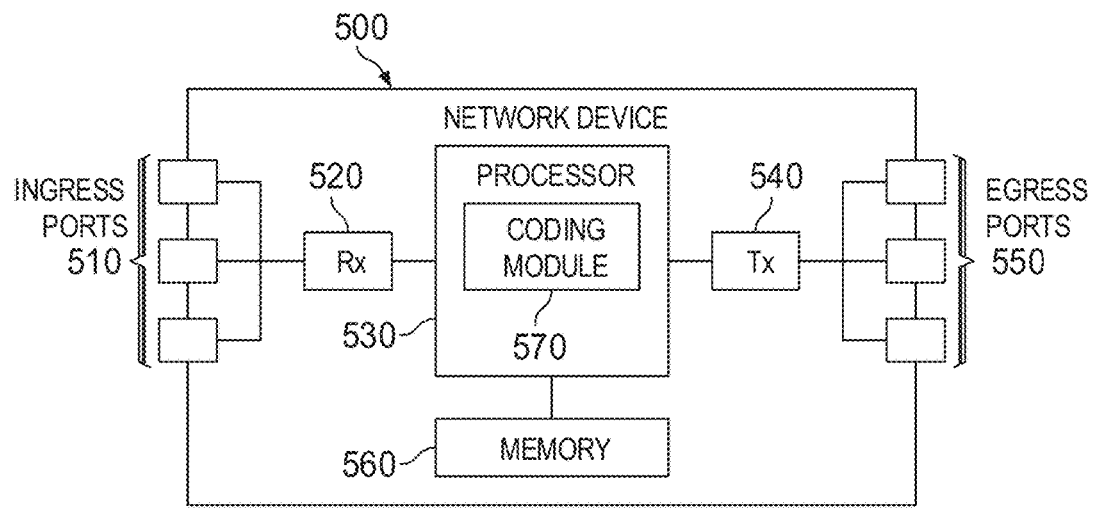
FIG. 5 is a block diagram illustrating an example of an encoding apparatus or a decoding apparatus according to an embodiment.

FIG. 5 is a schematic diagram of a coding device 500 according to an embodiment of the disclosure. The coding device 500 is suitable for implementing the disclosed embodiments as described herein. In an embodiment, the coding device 500 may be a decoder such as video decoder 30 of FIG. 1 or an encoder such as video encoder 20 of FIG. 1. In an embodiment, the coding device 500 may be one or more components of the video decoder 30 of FIG. 1 or the video encoder 20 of FIG. 1 as described above.

The coding device 500 comprises ingress ports 510 and receiver units (Rx) 520 for receiving data; a processor, logic unit, or central processing unit (CPU) 530 to process the data; transmitter units (Tx) 540 and egress ports 550 for transmitting the data; and a memory 560 for storing the data. The coding device 500 may also comprise optical-to-electrical (OE) components and electrical-to-optical (EO) components coupled to the ingress ports 510, the receiver units 520, the transmitter units 540, and the egress ports 550 for egress or ingress of optical or electrical signals.

The processor 530 is implemented by hardware and software. The processor 530 may be implemented as one or more CPU chips, cores (e.g., as a multi-core processor), FPGAs, ASICs, and DSPs. The processor 530 is in communication with the ingress ports 510, receiver units 520, transmitter units 540, egress ports 550, and memory 560. The processor 530 comprises a coding module 570. The coding module 570 implements the disclosed embodiments described above. For instance, the coding module 570 implements, processes, prepares, or provides the various coding operations. The inclusion of the coding module 570 therefore provides a substantial improvement to the functionality of the coding device 500 and effects a transformation of the coding device 500 to a different state. Alternatively, the coding module 570 is implemented as instructions stored in the memory 560 and executed by the processor 530.

The memory 560 comprises one or more disks, tape drives, and solid-state drives and may be used as an overflow data storage device, to store programs when such programs are selected for execution, and to store instructions and data that are read during program execution. The memory 560 may be volatile and/or non-volatile and may be read-only memory (ROM), random access memory (RAM), ternary content-addressable memory (TCAM), and/or static random-access memory (SRAM).

Figure 4:
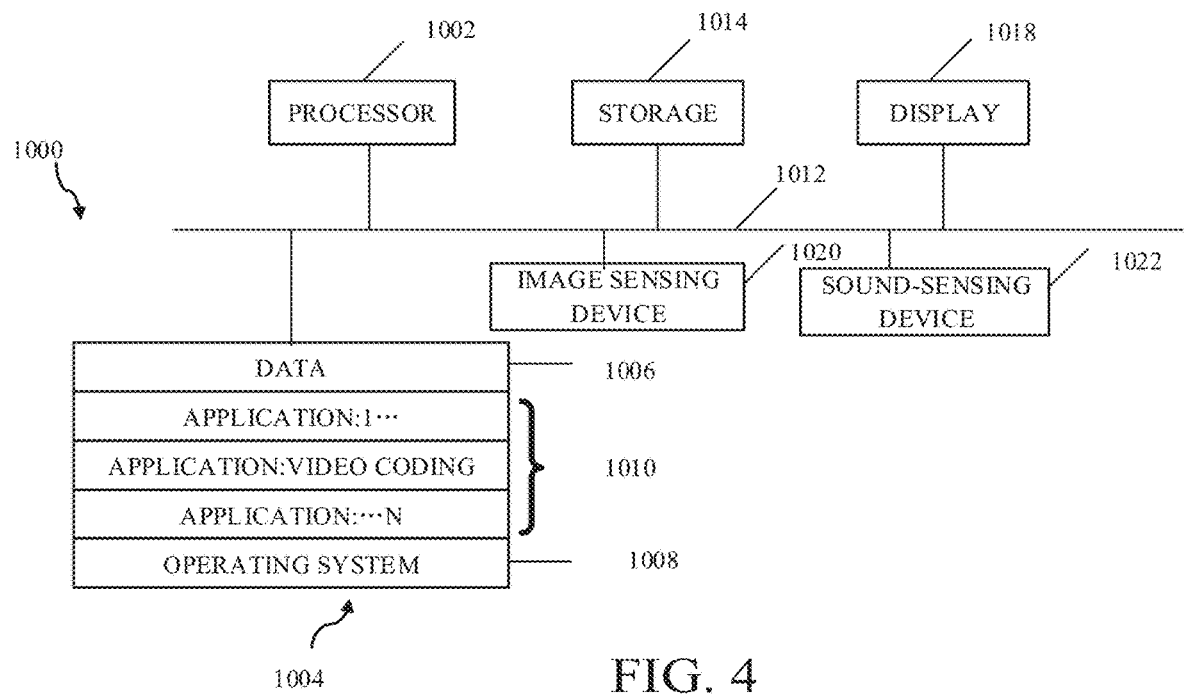
FIG. 4 is a schematic diagram of a coding device according to an embodiment.

FIG. 4 is a simplified block diagram of an apparatus 1000 that may be used as either or both of the source device 12 and the destination device 14 from FIG. 1A according to an exemplary embodiment. The apparatus 1000 can implement techniques of this present application. The apparatus 1000 can be in the form of a computing system including multiple computing devices, or in the form of a single computing device, for example, a mobile phone, a tablet computer, a laptop computer, a notebook computer, a desktop computer, and the like.

A processor 1002 in the apparatus 1000 can be a central processing unit. Alternatively, the processor 1002 can be any other type of device, or multiple devices, capable of manipulating or processing information now-existing or hereafter developed. Although the disclosed implementations can be practiced with a single processor as shown, e.g., the processor 1002, advantages in speed and efficiency can be achieved using more than one processor.

A memory 1004 in the apparatus 1000 can be a read only memory (ROM) device or a random access memory (RAM) device in an implementation. Any other suitable type of storage device can be used as the memory 1004. The memory 1004 can include code and data 1006 that is accessed by the processor 1002 using a bus 1012. The memory 1004 can further include an operating system 1008 and application programs 1010, the application programs 1010 including at least one program that permits the processor 1002 to perform the methods described here. For example, the application programs 1010 can include applications 1 through N, which further include a video coding application that performs the methods described here. The apparatus 1000 can also include additional memory in the form of a secondary storage 1014, which can, for example, be a memory card used with a mobile computing device. Because the video communication sessions may contain a significant amount of information, they can be stored in whole or in part in the secondary storage 1014 and loaded into the memory 1004 as needed for processing.

The apparatus 1000 can also include one or more output devices, such as a display 1018. The display 1018 may be, in one example, a touch sensitive display that combines a display with a touch sensitive element that is operable to sense touch inputs. The display 1018 can be coupled to the processor 1002 via the bus 1012. Other output devices that permit a user to program or otherwise use the apparatus 1000 can be provided in addition to or as an alternative to the display 1018. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 1000 can also include or be in communication with an image-sensing device 1020, for example a camera, or any other image-sensing device 1020 now existing or hereafter developed that can sense an image such as the image of a user operating the apparatus 1000. The image-sensing device 1020 can be positioned such that it is directed toward the user operating the apparatus 1000. In an example, the position and optical axis of the image-sensing device 1020 can be configured such that the field of vision includes an area that is directly adjacent to the display 1018 and from which the display 1018 is visible.

The apparatus 1000 can also include or be in communication with a sound-sensing device 1022, for example a microphone, or any other sound-sensing device now existing or hereafter developed that can sense sounds near the apparatus 1000. The sound-sensing device 1022 can be positioned such that it is directed toward the user operating the apparatus 1000 and can be configured to receive sounds, for example, speech or other utterances, made by the user while the user operates the apparatus 1000.

Although FIG. 4 depicts the processor 1002 and the memory 1004 of the apparatus 1000 as being integrated into a single unit, other configurations can be utilized. The operations of the processor 1002 can be distributed across multiple machines (each machine having one or more of processors) that can be coupled directly or across a local area or other network. The memory 1004 can be distributed across multiple machines such as a network-based memory or memory in multiple machines performing the operations of the apparatus 1000. Although depicted here as a single bus, the bus 1012 of the apparatus 1000 can be composed of multiple buses. Further, the secondary storage 1014 can be directly coupled to the other components of the apparatus 1000 or can be accessed via a network and can comprise a single integrated unit such as a memory card or multiple units such as multiple memory cards. The apparatus 1000 can thus be implemented in a wide variety of configurations.

In video compression, inter prediction is a process of using reconstructed samples of previously decoded reference pictures by specifying motion vectors relative to a current block. These motion vectors can be coded as a prediction residual by using spatial or temporal motion vector predictors. The motion vectors can be at sub-pixel accuracy. In order to derive the sub-pixel precision pixel values in the reference frames from the reconstructed integer position values, an interpolation filter is applied. Bi-prediction refers to a process where the prediction for the current block is derived as a weighted combination of two prediction blocks derived using two motion vectors from two reference picture areas. In this case, in addition to the motion vectors, the reference indices for the reference pictures from which the two prediction blocks are derived also need to be coded. The motion vectors for the current block can also be derived through a merge process where a spatial neighbour's motion vectors and reference indices are inherited without coding any motion vector residuals. In addition to spatial neighbours, motion vectors of previously coded reference frames are also stored and used as temporal merge options with appropriate scaling of the motion vectors to take into account the distance to the reference frames relative to the distance to the reference frames for the current block.

Several methods have been proposed for performing a decoder-side motion vector refinement or derivation so that the motion vector residual coding bits can be further reduced.

Figure 6A:
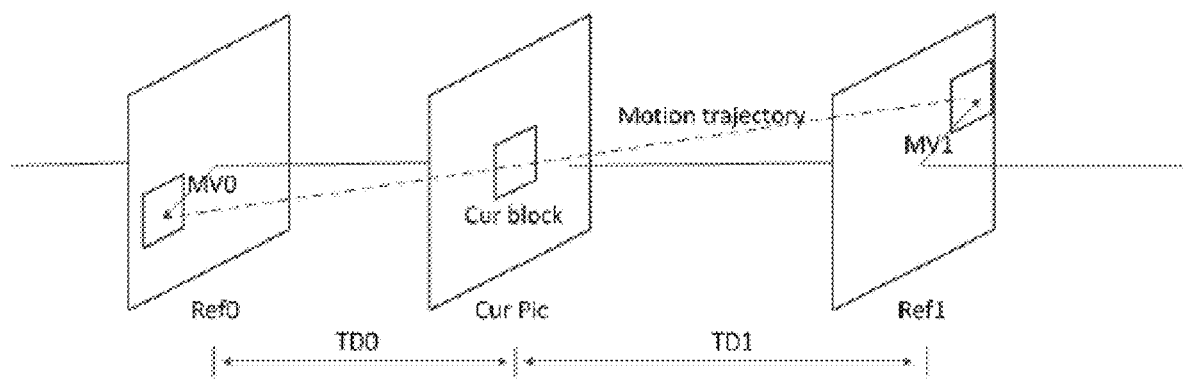
FIG. 6A is a graphical illustration of the temporal distances for conditional decoder-side motion vector refinement in video coding.

In a class of methods, called bilateral matching (BM) methods, the motion information of the current CU is derived by finding the closest match between two blocks along the motion trajectory of the current CU in two different reference pictures. This is shown in FIG. 6A. Under the assumption of continuous motion trajectory, the motion vectors MV0 and MV1 pointing to the two reference blocks shall be proportional to the temporal distances, i.e., TD0 and TD1, between the current picture and the two reference pictures.

In the bilateral matching merge mode, bi-prediction is always applied since the motion information of a CU is derived based on the closest match between two blocks along the motion trajectory of the current CU in two different reference pictures.

Explicit merge mode to indicate template matching merge or bilateral matching merge can be signaled to differentiate these modes from a default merge mode that does not require any decoder-side motion vector derivation.

In some examples, the temporal distances are ignored and bilateral matching is performed using motion vectors that have the equal magnitude and opposite signs in the past and future reference frames.

In some examples, no merge index is signaled while in other examples, to simplify the decoder complexity of performing multiple motion compensations, an explicit merge index is signaled.

Figure 6B:
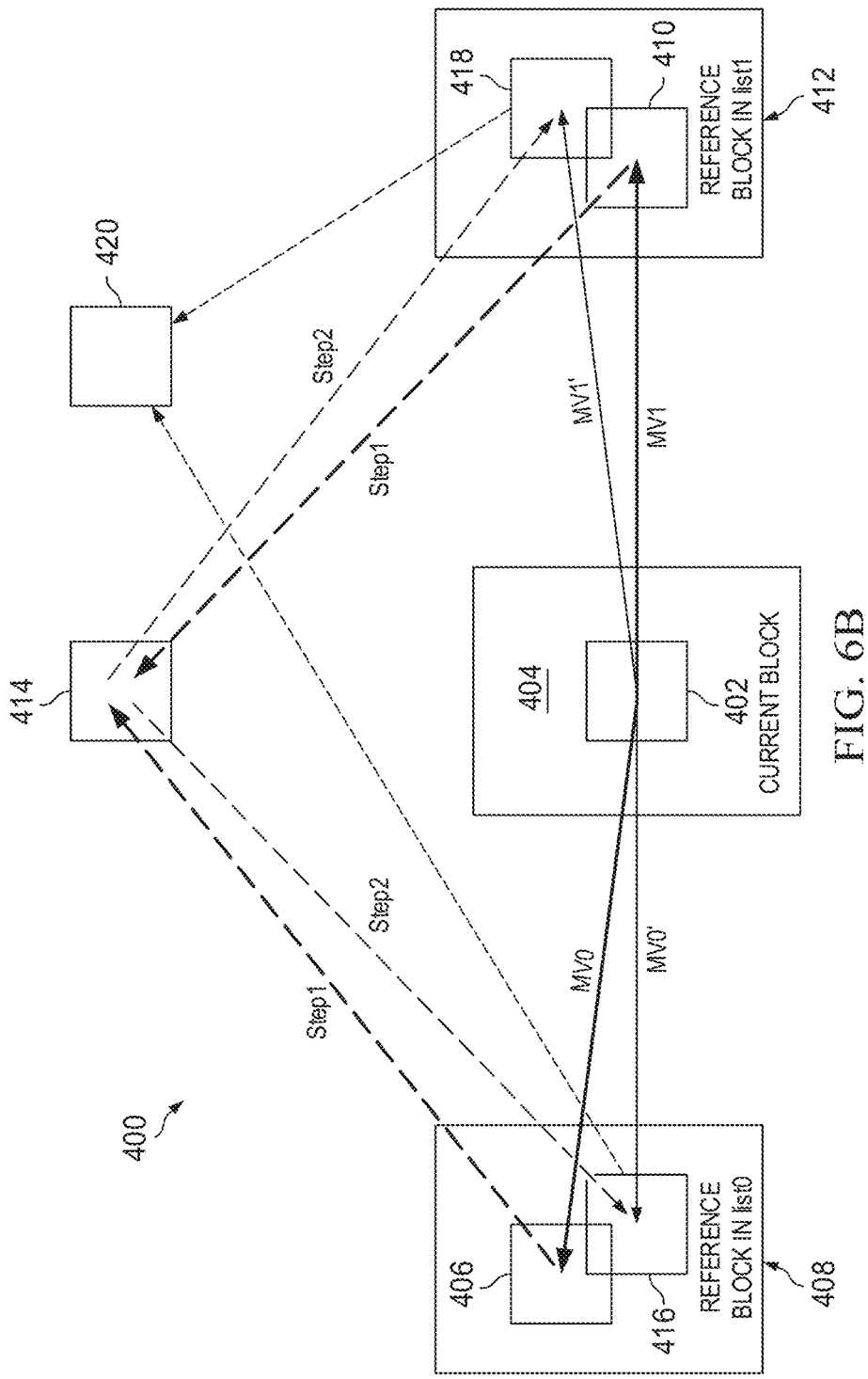
FIG. 6B is a graphical illustration of an example of a decoder-side motion vector refinement (DMVR) procedure according to an embodiment.

FIG. 6B is a graphical illustration of an example of a DMVR method 400 according to an embodiment. In an example, the DMVR method 400 begins with a current block 402 in a current picture 404. In an example, the current block 402 may be square or non-square in shape. The current picture 404 may also be referred to as a current region, image, tile, and so on. As shown in FIG. 6B, MV0 points to a first reference block (also refer to a first initial reference block) 406 in a first reference picture 408 and MV1 points to a second reference block (also refer to a second initial reference block) 410 in a second reference picture 412. In an example, the first reference block 406 is ahead of the current block 402 in time, sequence, decoding order, or some other parameter. In an example, the second reference block 410 is ahead of the current block 402 in time, sequence, decoding order, or some other parameter. The first reference block 406 and the second reference block 410 may be referred to herein as initial reference blocks.

The first reference block 406 and the second reference block 410 are combined to form the bi-lateral template block 414. In an example, the first reference block 406 and the second reference block 410 are averaged together to generate the bi-lateral template block 414. In an example, the bi-lateral template block 414 is generated as the weighted combination of the first reference block 406 and the second reference block 410.

Once the bi-lateral template block 414 has been generated, a template matching operation is performed. The template matching operation involves calculating a first cost between the bi-lateral template block 414 and each candidate reference block in the sample region around the first reference block 406 and a second cost between the bi-lateral template block 414 and each candidate reference block in the sample region around the second reference block 410. In an example, the potential reference block that yields the corresponding lowest cost (e.g., minimum template cost) determines which reference block in each sample region will serve as a refined reference block (a.k.a., a revised reference block). In an example, the first and second costs are determined using a SAD. Other cost measures may be utilized in practical applications.

In the example of FIG. 6B, the first refined reference block 416 in the first reference picture 408, which is pointed to by MV0', resulted in the lowest first cost, and the second refined reference block 418 in the second reference picture 412, which is pointed to by MV1', offered the lowest second cost. In an example, the first refined reference block 416 and the second refined reference block 418 replace the first reference block 406 and the second reference block 410, respectively.

Thereafter, a prediction block 420 is generated using the first refined reference block 416 and the second refined reference block 418. The prediction block 420 may be referred to as a predictor block or the final bi-prediction results. Once generated, the prediction block 420 may be used to generate an image for display on the display of an electronic device (e.g., smart phone, tablet device, laptop computer, etc.)

The DMVR method 400 may be applied for the merge mode of bi-prediction with one MV from a reference picture in the past and another from a reference picture in the future without having to transmit additional syntax elements. The DMVR method 400 is not applied when local illumination compensation (LIC), affine motion, frame-rate up-conversion (FRUC), or CU merge candidate is enabled for a CU in the Joint Exploration Model (JEM) reference software.

In the JEM reference software, nine MV candidates (which will point to nine candidate reference blocks) are searched for each reference block in a reference picture (e.g., for each list, e.g. list 0 or list 1). The nine MV candidates include an original MV (namely an initial MV, e.g. initial MV0 or initial MV1) pointing to the reference block (namely an initial reference block, e.g., reference block 406 or reference block 410) and the eight MVs pointing to reference blocks around the reference block with one luma sample offset relative to the original MV in either a horizontal direction, a vertical direction, or both. However, using MV candidates having a one luma sample offset relative to the original MV may not provide the best MV candidate.

Figure 6C:
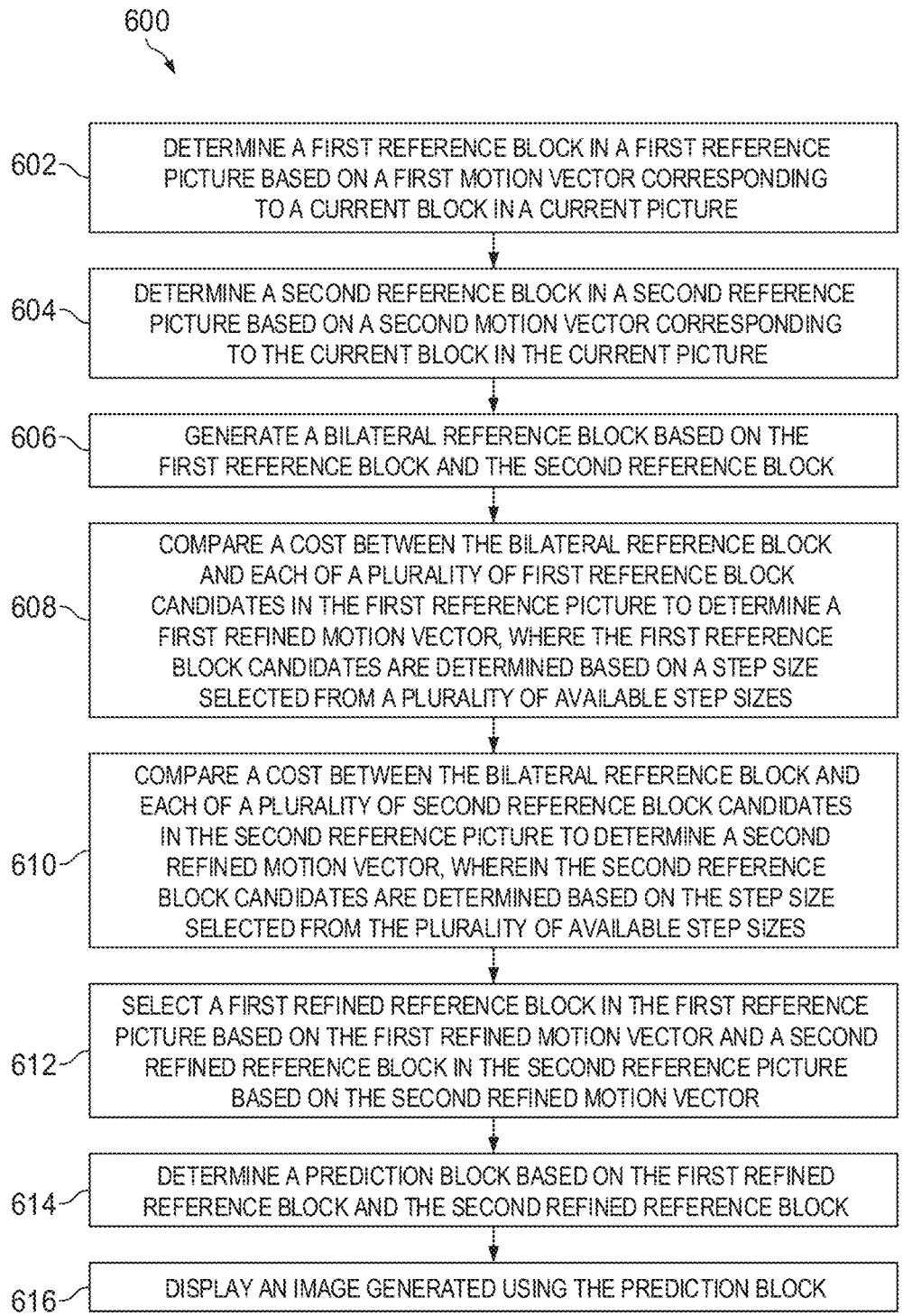
FIG. 6C is a flowchart illustrating an example of a decoder-side motion vector refinement (DMVR) procedure in reference with FIG. 6B according to an embodiment.

In an example method, bilateral template matching based decoder-side motion vector refinement (DMVR) method is provided, a bilaterally averaged template is first created using the reference blocks in L0 and L1 reference obtained from explicitly signaled merge candidate index and bilateral matching is performed against this template. This is illustrated in FIGS. 6B and 6C. The template is updated if there is any movement between an initial reference block (406, 410) referred by the initial motion vector and a reference block (416, 418) referred by the latest best motion vector. Also, in some examples, the refinement is performed in one reference and the motion vector in the other reference is obtained through mirroring of this refined motion vector. The refinement alternates between the two references until either the center position has the least matching error or the maximum number of iterations is reached.

FIG. 6C is a flowchart illustrating an example of a coding method 600. In an example, the coding method 600 is implemented in a decoder such as the video decoder 30 in FIG. 1. The coding method 600 may be implemented when, for example, a bitstream received from an encoder, such as the video encoder 20 of FIG. 1, is to be decoded in order to generate an image to be displayed on the display of an electronic device. The coding method 600 may also be implemented in an encoder such as the video encoder 20 in FIG. 1. The coding method 600 will be described with reference to the elements identified in FIG. 6B.

In block 602, a first reference block (e.g., reference block 406) in a first reference picture (e.g., reference picture 408) is determined based on a first motion vector (e.g., MV0) corresponding to a current block (e.g., current block 402) in a current picture (e.g., current picture 404).

In block 604, a second reference block (e.g., reference block 410) in a second reference picture (e.g., reference picture 412) is determined based on a second motion vector (e.g., MV1) corresponding to the current block (e.g., current block 402) in the current picture (e.g., current picture 604).

In block 606, a bilateral reference block (e.g., bi-lateral reference block 414) is generated based on the first reference block and the second reference block. In an example, the bilateral reference block is obtained using a weighted average of the first reference block and the second reference block.

In block 608, a cost comparison between the bilateral reference block and each of a plurality of first reference block candidates in the first reference picture is performed. The first reference block candidates may be, for example, the various reference blocks surrounding the first reference block 406 in the first reference picture 408. The cost comparison is used to determine a first refined motion vector (e.g., MV0'). In an example, the first reference block candidates are determined based on a step size that was selected from a plurality of available step sizes (e.g., ⅛, ¼, ½, 1, and so on).

In block 610, a cost comparison between the bilateral reference block and each of a plurality of second reference block candidates in the second reference picture is performed. The second reference block candidates may be, for example, the various reference blocks surrounding the second reference block 410 in the second reference picture 412. The cost comparison is used to determine a second refined motion vector (e.g., MV1'). In an example, the second reference block candidates are determined based on a step size that was selected from the plurality of available step sizes (e.g., ⅛, ¼, ½, 1, and so on).

In block 612, a first refined reference block (e.g., refined reference block 416) in the first reference picture is selected based on the first refined motion vector and a second refined reference block (e.g., refined reference block 418) in the second reference picture is selected based on the second refined motion vector.

In block 614, a prediction block (e.g., prediction block 420) is determined based on the first refined reference block and the second refined reference block.

In block 616, an image generated using the prediction block is displayed on the display of an electronic device.

In some examples of the methods of refinement, a CU level refinement is first performed. Then a sub-CU (namely sub-block) level multi-candidate evaluation is performed using the CU-level refined MVs as multiple candidates. Optionally, each sub-CU can perform its own refinement with respect to the best matching candidate. In another example, a CU level refinement is not performed and each sub-CU can perform its own refinement.

Some cost functions use a motion vector refinement distance as a bias term.

Given the implicit decoder-side derivation or refinement process, the encoder needs to perform these operations in exactly the same manner as the decoder in order for the encoder-side reconstruction to match with the decoder-side reconstruction.

Typically, only luma samples are used during the decoder side motion vector refinement or derivation process. However, in some cases, chrominance is also motion compensated using the final refinement motion vectors (suitably scaled to account for any chroma downsampling) as used for luma motion compensation.

One other technique for motion vector refinement on the decoder-side is call bi-directional optical flow (BIO) technique. In this method, motion compensated interpolation is performed for a given coding unit using a normative motion compensation method that uses the samples from the two reference frames indicated by the reference indices and motion vectors associated with the coding unit. In addition, horizontal and vertical gradients at the sub-pixel precision positions are evaluated from the reference samples used for motion compensation or using the motion compensated samples themselves. A coding unit is partitioned into uniformly sized sub-blocks where the sub-block sizes can be 1×1 pixel, 2×2 pixels, 4×4 pixels, etc. An optical flow based equation that relates various values associated the reference frames to generate an estimate of the sample values $\text{pred}_{BIO}$ of the sub-block in the current frame is provided below in Eqn. (1). In Eqn. (1), (vx, vy) represents the flow of the sub-block from reference frame L0 to the current frame and then to reference frame L1. Gx0 and Gy0 represent the gradients in the horizontal and vertical directions in L0, respectively. Gx1 and Gy1 represent the gradients in the horizontal and vertical directions in L1, respectively. I0 and I1 represent the intensity values of the two reference patches in L0 and L1, respectively. $\tau_1$ and $\tau_0$ denote the distances of the current frame to the reference frames L0 and L1, respectively. $\tau_0$=POC(current)−POC(Ref0), $\tau_1$=POC(Ref1)−POC(current).

$$\text{pred}_{BIO}=\tfrac{1}{2}(I0+I1+vx/2(\tau 1 Gx1-\tau 0 Gx0)+vy/2*(\tau 1 Gy1-\tau 0 Gy0)) \quad (1)$$

Using the individual flow equations in each time interval, the difference between the predictor (i.e. the predicted sample values of the sub-block) using L0 samples and the predictor using L1 samples can be written as:

$$\Delta=(I0-I1)+vx(\tau 1 Gx1+\tau 0 Gx0)+vy(\tau 1 Gy1+\tau 0 Gy0)$$

By minimizing the difference Δ, estimates of vx and vy can be obtained. For example, by taking partial differentials of the square of the difference Δ with respective to vx and vy and setting the differentials to zero, equations with vx and vy as unknowns for the samples within the sub-block and for samples adjoining the sub-block are obtained. This set of over-constrained equations can be solved through least squares to obtain vx and vy estimates. Using the equation Eqn. (1) mentioned above, the computed vx, vy estimates and the gradients Gx0 and Gy0, a correction term is added to the usual bi-predictive motion compensation. In some methods, τ0 and τ1 are assumed to be equal in these equations.

As described above, the bilateral matching based decoder-side motion vector derivation/refinement methods compute delta motion vectors (i.e. changes to the initial motion vectors MV0 and MV1) around the merge-mode motion vectors (i.e. the merge candidate which includes initial motion vectors MV0 and MV1) in the two references (used for bi-prediction). The computed delta motion vectors depend on the temporal distances TD0 and TD1 from the current picture to the two references. However, since a movement of integer distance in one reference can be a movement of non-integer distance in the other reference due to the ratio between TD1 and TD0, evaluating the refinement requires evaluation of sub-pixel precision positions of a different phase when compared to the phase of the merge mode motion vectors which constitute the starting positions for the refinement (For example, When TD1 and TD0 are not equal, if L0 pic is at a distance of 2 and L1 is at a distance of 1, the refinement movement of 1 pixel in L0 leads to 0.5 pixel movement in L1). Thus it leads to the high computational complexity of the refinement procedure. In order to simplify the refinement procedure, the refinement procedure may ignore TD0 and TD1 and uses delta motion vectors that are equal in magnitude and opposite in directions in the two references so that integer distance movement in one reference remains as an integer distance movement in the other reference. Multiple iterations of refinement are applied until either a pre-defined maximum iteration count is reached or the center position of a given iteration turns out to be the position with the lowest cost. This method also works well in cases where a hierarchical B-pictures in a dyadic configuration are employed as used in the common test conditions adopted in Versatile Video Coding. In such dyadic configuration, the number of pictures at the next temporal layer are twice as many as the number of pictures in the current temporal layer. Hence, the B-pictures have one reference from the past and one reference from the future that are equi-distant from the current picture.

However, due to occlusions in one of the references, the candidate merge motion vector may be applicable for uni-prediction or the candidate merge motion vectors may refer to two reference frames that have unequal distance to the current picture. Also, in commercial encoders, strict dyadic hierarchical B-pictures may not be used as they tend to adapt the picture-types based on temporal correlation. For example, some encoders use 2 non-reference pictures between every two reference pictures. Certain other encoders have variable distances between pictures belonging to the same temporal layer due to the underlying motion characteristics. In such cases, the use of equal and opposite delta motion vectors based refinement fails to produce any major coding gain and can also impact the coding gain whenever an explicit flag is not used to indicate the need for refinement. However, signaling a flag for every CU to indicate the use of refinement offsets some of the coding gains offered by the refinement.

Hence, there is a need to selectively or adaptively provide the ability to restrict or enable the decoder-side refinement to coding units with equi-distant references, for example, whenever bilateral matching based refinement with equal and opposite delta motion vectors is used.

Also, whenever the BIO method assumes equal $\tau 0$ and $\tau 1$, there is a need to provide the ability to restrict or enable the BIO method to be applied only when the temporal distances are really equal.

The present disclosure addresses the above problems by providing a method to selectively restrict or enable a bi-predictive merge-mode coding unit coded in at least one access unit in a group of frames from employing decoder side motion vector refinement based on the temporal distances of the coding unit to its two references. Such restriction can be performed through setting a flag at the sequence parameter set level on the encoding-side to permit decoder-side MV refinement only when the temporal distances of the coding unit to its two references are substantially equal. This method is employed at both the encoding and decoding sides when the decoder side MV refinement is enabled.

DETAILED EXAMPLES OF EMBODIMENTS OF THE PRESENTED METHOD

An embodiment of the present disclosure provides a method for restricting decoder-side motion vector derivation/refinement to only Coding Units with equal-distance references. The embodiment may be used in cases when decoder-side MV refinement is used. For example, the method can be used when the bilateral matching based decoder-side MV refinement is employed with delta motion vectors that are equal in magnitude and opposite in sign in the two references used for bi-prediction (irrespective of whether bi-lateral template is used or not). As explained before, such methods ignore the temporal distances to the reference frames from the current picture so that integer-distance refinements starting from the sub-pixel precision merge motion vector centers can be performed using interpolation of samples at a single sub-pixel phase in each of the references. Merge motion vector obtained from a merge candidate list can be at any sub-pixel location. For example, sub-pixel precision may be at $\frac{1}{16}$. The method can also be used when the Bi-directional optical flow (BDOF) based decoder-side motion vector refinement does not rely on the temporal distances or assumes them to be equal.

Figure 7:
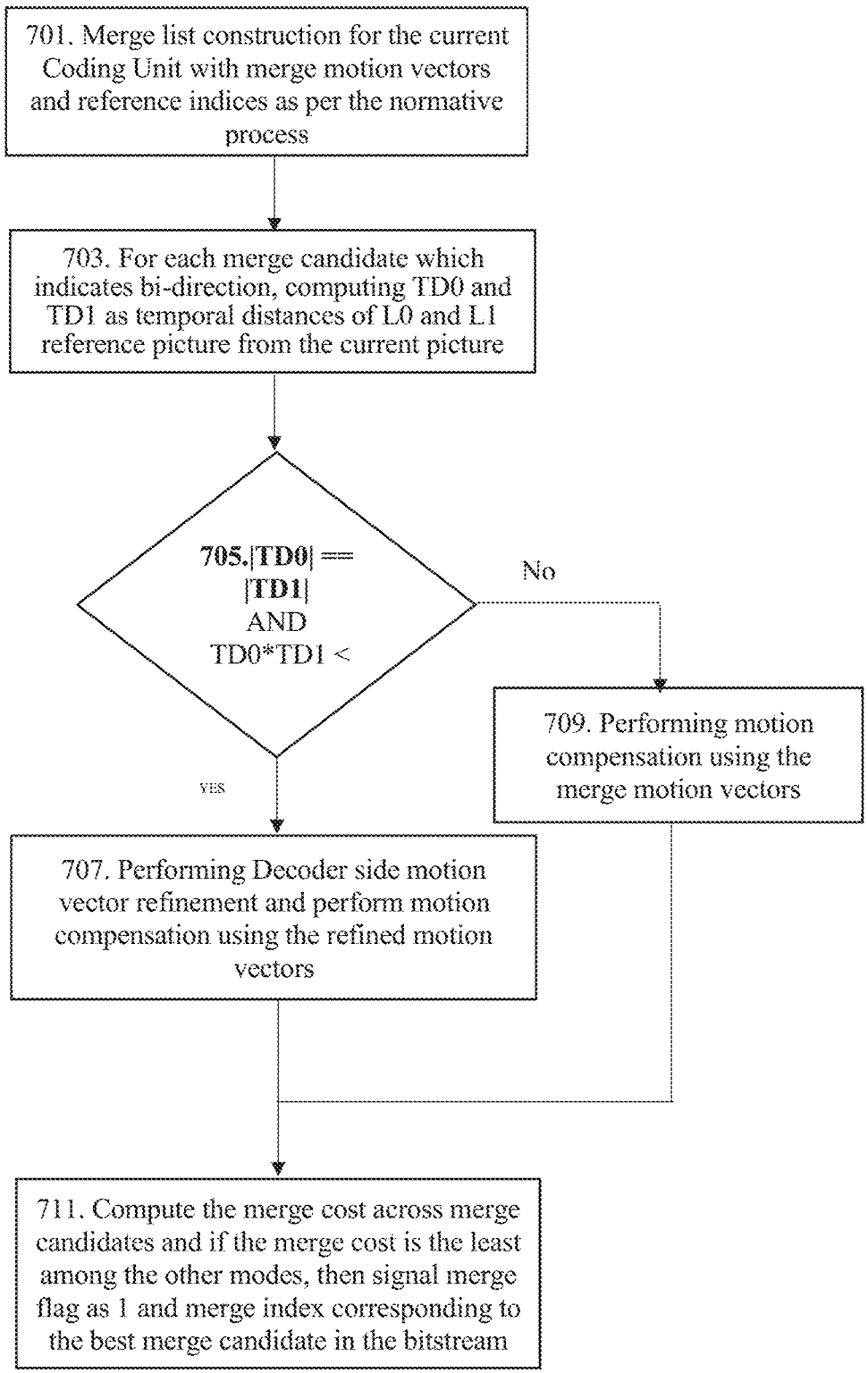
FIG. 7 is a flowchart illustrating an example of an encoding method according to an embodiment.

In an embodiment, the decoder-side MV refinement is employed for a given coding unit or coding block only when the temporal distance from the coding block to the reference pictures used for bi-prediction are substantially equal in magnitude and opposite in sign or direction. FIG. 7 is a flowchart illustrating an embodiment of an encoding method 700. In an embodiment, the encoding method 700 is implemented in an encoder such as video encoder 20 in FIG. 1. In block 701, once the merge candidate list which includes one or more merge candidate is constructed as per the normative process on the encoding or decoding side, the merge motion vectors and their reference indices become available. In block 703, for each merge candidate that indicates bi-prediction, the 2 reference frames, referred to herein as L0 and L1 references, corresponding to the 2 reference indices required for bi-prediction are identified and their temporal distances to the current-picture, namely, TD0 and TD1 are obtained. In block 705, it is determined whether the temporal distance to the reference pictures used for bi-prediction are substantially equal in magnitude and opposite in sign. In block 707, in the case that the temporal distances are substantially equal in magnitude and opposite in sign, the encoder or decoder performs the normative decoder-side MV refinement process for the merge candidate. The refined motion vectors are used to perform motion compensated bi-prediction using the reference frames L0 and L1. If it is determined in block 705 that the temporal distance to the reference pictures used for bi-prediction are substantially equal in magnitude and opposite in sign, in block 709, the decoder-side MV refinement is skipped, and the merge motion vectors are used for bi-prediction. In block 711, if the best merge mode candidate has a lower cost than any other mode evaluated, then the encoder will signal a merge flag as 1 for the coding unit. Additionally, the encoder can also explicitly signal the merge candidate index for the winning merge candidate in the merge list. In some cases, this may be implicitly derived on the decoding side.

Figure 8:
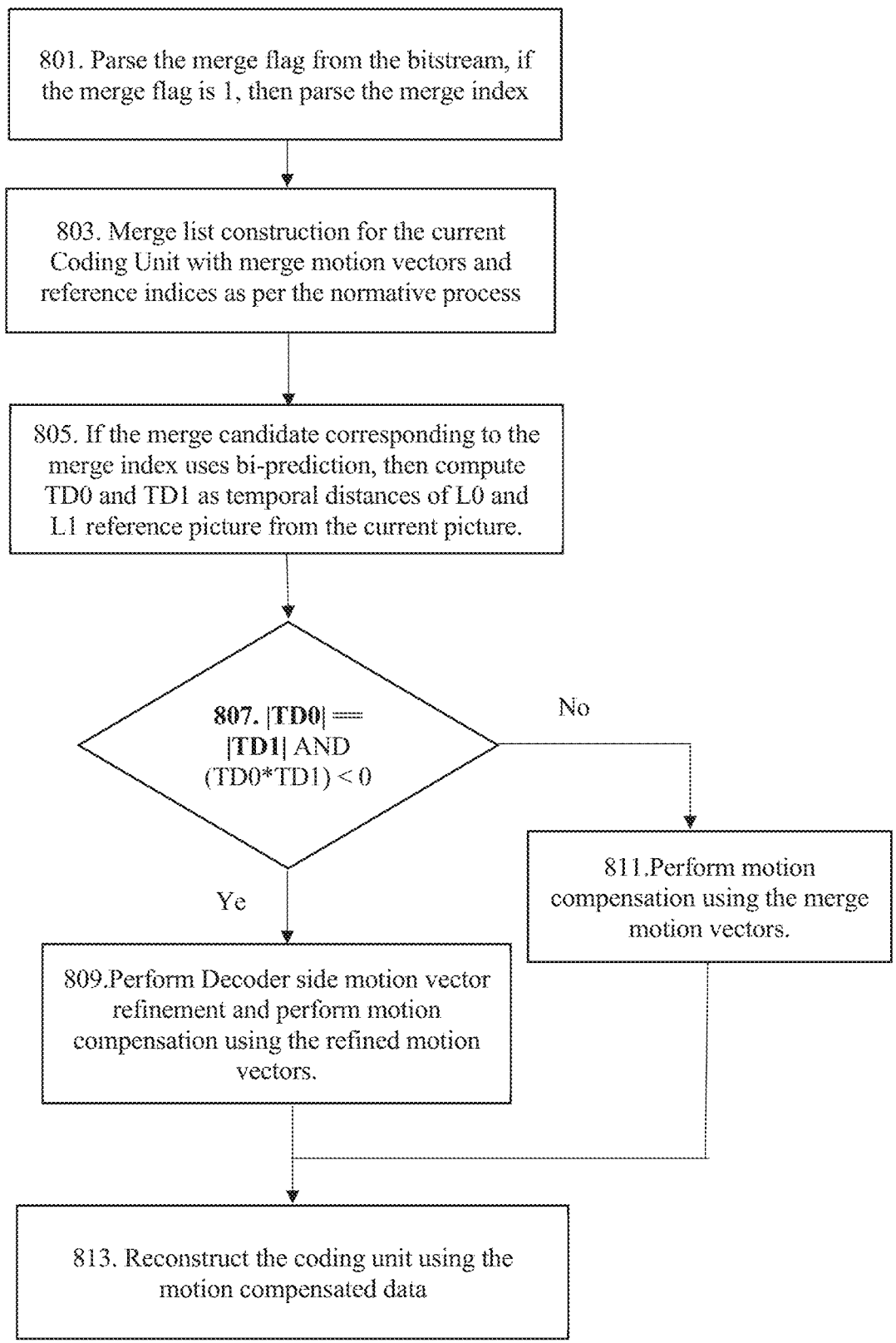
FIG. 8 is a flowchart illustrating an example of a decoding method according to an embodiment.

FIG. 8 is a flowchart illustrating an embodiment of a decoding method 800. In an embodiment, the decoding method 800 is implemented in a decoder such as video decoder 30 in FIG. 1. In block 801, for a coding unit, a merge flag is parsed from a received bitstream, if the merge flag is set to true (such as 1), the merge candidate is obtained either by decoding the explicitly signaled merge index or by implicitly deriving it on the decoding side. In block 803, the normative merge list construction process is used to arrive at the motion vector(s) and reference index (or indices) associated with the merge index. In block 805, if the merge candidate indicates bi-prediction, then the 2 reference frames corresponding to the 2 reference indices are identified and their temporal distances to the current pictures, namely TD0 and TD1, are obtained. In block 807, it is determined whether the temporal distance to the reference pictures used for bi-prediction are substantially equal in magnitude and opposite in sign. In block 809, in the case that the temporal distances are substantially equal in magnitude and opposite in sign, the decoder performs the normative decoder-side MV refinement process for the merge candidate. In particular, if adoption of decoder-side motion vector refinement is enabled at the sequence level, then the decoder-side MV refinement is performed only when TD0 and TD1 are substantially equal in magnitude and opposite in sign. The refined motion vectors are used for performing motion compensated bi-prediction using the reference frames L0 and L1. Otherwise, in block 811, the decoder-side MV refinement is skipped and the motion vectors for the merge index are used to perform motion compensated bi-prediction. In block 813, the coding block is reconstructed based on the motion compensated data, for example, a sum of the parsed residual data and the predicted data.

In another embodiment, the same checks on TD0 and TD1 also may be used for bi-directional optical flow (BIO) based method (where TD0 corresponds to τ0 and TD1 corresponds to −τ0 described above) to enable BIO based method to a given coding unit only when TD0 and TD1 are substantially equal and have opposite signs.

Figure 9:
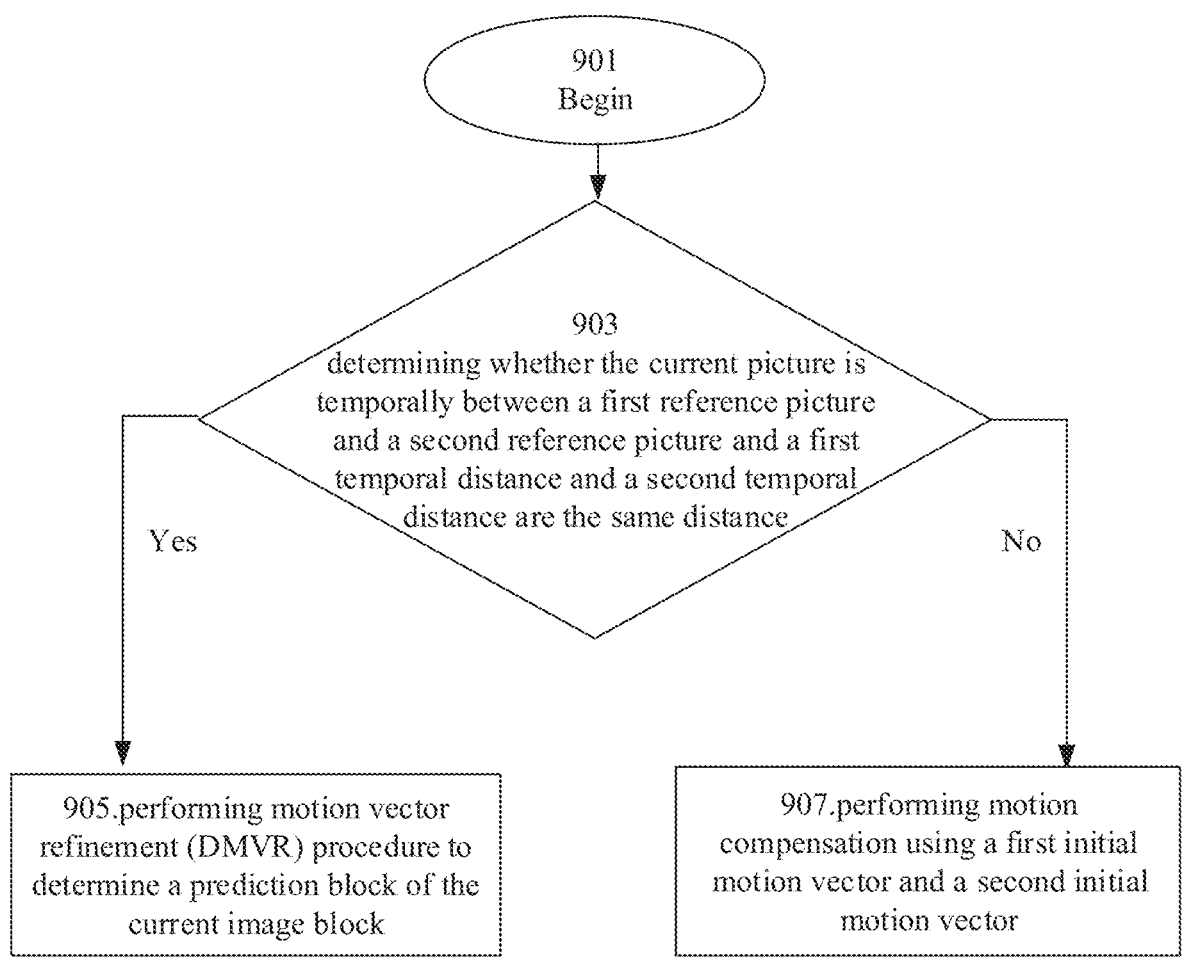
FIG. 9 is a flowchart illustrating an example of a method for inter-prediction of a current image block in a current picture of a video according to an embodiment.

FIG. 9 is a flowchart of a method for inter-prediction (bi-prediction) of a current image block in a current picture of a video. The method starts at operation 901.

At operation 903, it is determined whether the current picture is temporally between a first reference picture (such as RefPic0) and a second reference picture (such as RefPic1) and a first temporal distance (such as TD0) and a second temporal distance (such as TD1) are the same distance, wherein the first temporal distance (TD0) is between the current picture and the first reference picture (RefPic0), and the second temporal distance (TD1) is between the current picture and the second reference picture (RefPic1).

At operation 905, motion vector refinement (DMVR) procedure is performed to determine a prediction block of the current image block, when it is determined that the current picture is temporally between the first reference picture (such as RefPic0) and the second reference picture (such as RefPic1) and the first temporal distance (TD0) and the second temporal distance (TD1) are the same distance. The motion vector refinement (DMVR) procedure can be performed as described above with respect to blocks 602 to 610 of FIG. 6C or blocks 632 to 640 of FIG. 6D. Other ways of performing the motion vector refinement can also be utilized.

At operation 907, motion compensation is performed to obtain a prediction block of the current image block using a first initial motion vector (MV0) and a second initial motion vector (MV1), when it is determined that the first temporal distance (TD0) and the second temporal distance (TD1) are different distance or the current picture is not temporally between the first reference picture (such as RefPic0) and the second reference picture (such as RefPic1).

Figure 10:
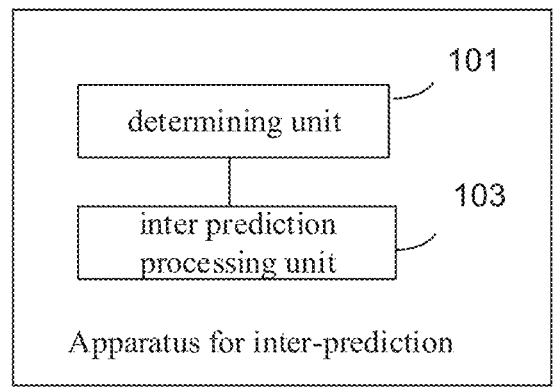
FIG. 10 is a block diagram showing an example structure of an apparatus for inter-prediction of a current image block in a current picture of a video according to an embodiment.

FIG. 10 is a block diagram showing an example structure of an apparatus for inter-prediction of a current image block in a current picture of a video. The apparatus may include: a determining unit 101 configured to determine whether the current picture is temporally between a first reference picture (such as RefPic0) and a second reference picture (such as RefPic1) and a first temporal distance (such as TD0) and a second temporal distance (such as TD1) are the same distance, wherein the first temporal distance (TD0) is between the current picture and the first reference picture (RefPic0), and the second temporal distance (TD1) is between the current picture and the second reference picture (RefPic1); and an inter prediction processing unit 103 configured to perform motion vector refinement (DMVR) procedure to determine a prediction block of the current image block, when it is determined that the current picture is temporally between the first reference picture (such as RefPic0) and the second reference picture (such as RefPic1) and the first temporal distance (TD0) and the second temporal distance (TD1) are the same distance.

In some embodiments, instead of always applying the above-mentioned temporal distance based checks in order to conditionally perform decoder-side motion vector refinement at the coding unit or coding block level, the checks can be conditionally performed only when a specific flag is signaled at the sequence parameter set level and/or picture level.

In one embodiment, a flag, such as sps_conditional_dmvr_flag, is signaled at the sequence parameter set level whenever decoder-side motion vector refinement is enabled at the sequence parameter set level. When this flag is set to zero, decoder-side MV refinement can be performed independent of the temporal distances to the reference frames from the current picture in all access units. When this flag is set to one, an additional flag, such as pps_conditional_dmvr_flag, is signaled at the picture parameter set level. When the pps_conditional_dmvr_flag is set to zero, decoder-side MV refinement can be performed independent of the temporal distances to the reference frames from the current picture. When the pps_conditional_dmvr_flag is set to one, decoder-side MV refinement can be performed only when the temporal distances to the reference frames from the current picture for a given CU are substantially equal in magnitude and opposite in sign.

An encoder can set sps_conditional_dmvr_flag to zero when regular dyadic hierarchical B-picture group of pictures (GOP) structure is used, the maximum number of reference frames in a B-picture is set to two, and the reference picture selection always selects reference frames having equal temporal distance to the current picture and falling on opposite sides of the current picture. An example of a dyadic GOP structure in display order is $I0_0$ $B1_4$ $B2_3$ $B3_4$ $B4_2$ $B5_4$ $B6_3$ $B7_4$ $B8_1$ $B9_4$ $B10_3$ $B11_4$ $B12_2$ $B13_4$ $B14_3$ $B15_4$ $P16_0$, where the subscript indicates the temporal layer and the numbers next to the picture type indicate the display order frame count.

An encoder can set sps_conditional_dmvr_flag to one when (a) regular dyadic hierarchical B-picture GOP structure is used, but the maximum number of reference frames for a B-picture is set to be greater than two, or (b) if the reference picture selection is likely to select reference pictures that do not have substantially equal temporal distance to the current picture or that do not fall on opposite sides of the current picture in display order, or (c) when a non-dyadic hierarchical B-pictures or non-dyadic single B-picture layer GOP structure is used. An example of a non-dyadic GOP-structure is $I0_0$ $B1_1$ $B2_1$ $P3_0$ $B4_1$ $B5_1$ $P6_0$ which has only one layer of B-pictures. An example of adaptive hierarchical B-pictures is $I0_0$ $B1_2$ $B2_2$ $B3_1$ $B4_2$ $P5_0$ where the spacing between two pictures at the same temporal layer level is decided adaptively based on content properties.

Alternatively, sps_conditional_dmvr_flag can be configured manually as an encoder parameter by a user based on the above stated conditions.

When sps_conditional_dmvr_flag is set to 1, an encoder can set pps_conditional_dmvr_flag to zero on frames that have their maximum number of reference frames set to 2, and whose reference frames are substantially equal in temporal distance from the current picture and fall on opposite sides of the current picture in display order.

When sps_conditional_dmvr_flag is set to 1, an encoder can set pps_conditional_dmvr_flag to one on frames that have their maximum number of reference frames set to a value greater than 2 or in cases where the 2 reference frames used for bi-prediction for a CU need not be at substantially equal temporal distance from the current picture or both the reference pictures do not fall on opposite sides of the current picture in display order. In an example wherein the encoding/decoding order sequence is $I0_0$ $P1_0$, $P6_0$, $B4_1$, $B2_2$, $B3_2$, $B5_2$, and the display order is $I0_0$ $P1_0$ $B2_2$ $B3_2$ $B4_1$ $B5_2$ $P6_0$, the picture $B2_2$ can have $I0_0$ $P1_0$, $P6_0$, $B4_1$, as its reference pictures. Among these reference pictures, reference pictures I0 and B4 are equal distance and opposite direction. Hence, when I0 and B4 are used as references for B2, the temporal distances are equal and opposite while that is not the case when P1 and B4 are used as references. When pps_conditional_dmvr_flag is set to one, a coding unit in B2 with I0 and B4 as references will use decoder-side MV refinement, while a coding unit in B2 with P1 and B4 as references cannot use decoder-side MV refinement (depending on the pre-determined ratio threshold, e.g. a ratio of a distance between a current picture and a first reference (refL0) to a distance between a second reference (refL1) and the current picture).

Since motion of an object is not necessarily linear from L0 to current picture and from current picture to L1, it is possible that equal and opposite motion assumption can sometimes work even when the reference pictures are not at substantially equal temporal distances. In certain embodiments, the encoder can perform the encoding for a frame with pps_conditional_dmvr_flag set to zero and another encoding for the same frame with pps_conditional_dmvr_flag set to one and select the setting that provides a lower rate-distortion optimized cost. The rate-distortion optimized cost is computed as a sum of a distortion measure of the reconstructed frame with respect to the source frame and the bits consumed multiplied by a suitable Lagrangian multiplier that depends on the average quantization parameter used for the frame.

In other embodiments, the rate-distortion optimized cost can be accumulated for both the case with decoder-side MV refinement and the case without decoder-side MV refinement for the coding units with temporal distances not substantially equal and the flag can be set to one for a subsequent picture if without refinement yields a lower accumulated cost than with refinement.

When substantially equal temporal distances to reference frames is not possible for any coding unit based on the GOP structure determined at the encoder, it is also possible to disable decoder-side motion vector refinement itself at the sequence parameter set (SPS) level or picture parameter set level. The conditional flag at the SPS level, if present, is signaled only when decoder-side motion vector refinement is enabled at the SPS level. The conditional flag at the PPS level, if present, is signaled only when decoder-side motion vector refinement is enabled at the PPS level (explicitly or implicitly). Any alternate method of signaling decoder-side MV refinement at SPS/PPS level, the ability to signal refinement unconditioned on the temporal distances to the reference, and refinement conditioned on the temporal distances to the reference is anticipated by this disclosure. For instance, instead of two flags, it is possible to code a syntax element that takes one of three possible values (e.g. 0, 1, and 2) by concatenating the two flags together.

Figure 6D:
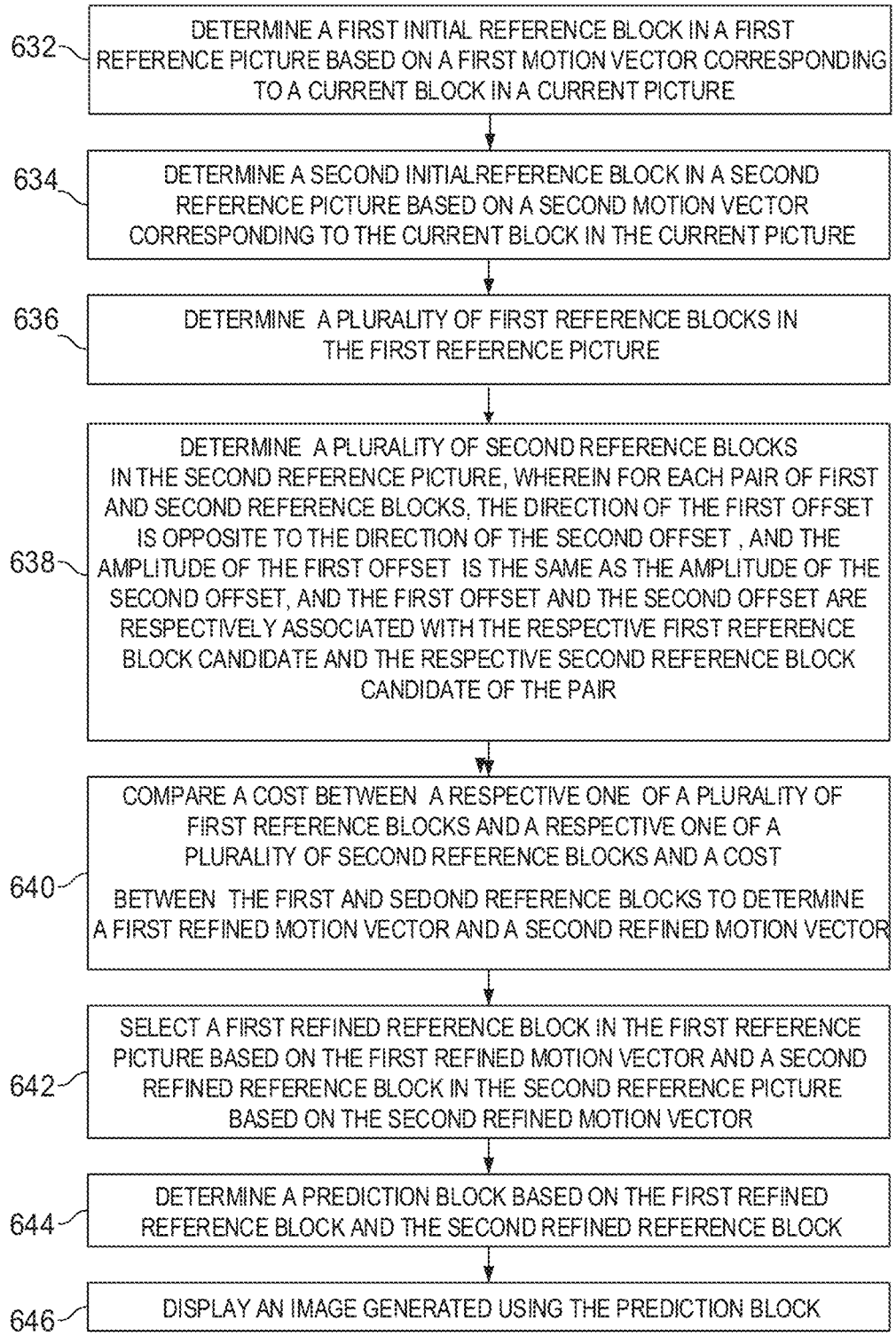
FIG. 6D is a flowchart illustrating another example of a decoder-side motion vector refinement (DMVR) procedure according to an embodiment.

FIG. 6D is a flowchart illustrating another example for performing a decoder-side motion vector refinement (DMVR) procedure or process. In an embodiment, the process is implemented in a decoder such as the video decoder 30 in FIG. 1. The process may be implemented when, for example, a bitstream received from an encoder, such as the video encoder 20 of FIG. 1, is to be decoded in order to generate an image on the display of an electronic device. The process is also implemented in an encoder such as the video encoder 20 in FIG. 1. The process will be described with reference to the elements identified in FIG. 6B.

In block 632, a position of a first initial reference block (e.g., reference block 406) in a first reference picture (e.g., reference picture 408) is determined based on a first motion vector (e.g., MV0) corresponding to a current block (e.g., current block 402) in a current picture (e.g., current picture 404).

In block 634, a position of a second initial reference block (e.g., reference block 410) in a second reference picture (e.g., reference picture 412) is determined based on a second motion vector (e.g., MV1) corresponding to the current block (e.g., current block 402) in the current picture (e.g., current picture 404).

In block 636, positions of a plurality of first reference blocks (e.g. N-1 first reference blocks) in the first reference picture is determined.

In block 638, positions of a plurality of second reference blocks (e.g. N-1 second reference blocks) in the second reference picture is determined. In blocks 636 and 638, positions of each pair of reference blocks includes a position of a first reference block and a position of a second reference block, and for each pair of reference blocks, the first position offset (delta0x, delta0y) and the second position offset (delta1x, delta1y) are mirrored (i.e. equal in magnitude and opposite in sign), and the first position offset (delta0x, delta0y) represents an offset of the position of the first reference block relative to the position of the first initial reference block, and the second position offset (delta1x, delta1y) represents an offset of the position of the second reference block relative to the position of the second initial reference block. In particular, for positions of each pair of first and second reference blocks, the direction of the first offset is opposite to the direction of the second offset, and the magnitude of the first offset is the same as the magnitude of the second offset, and the first offset and the second offset are respectively associated with the respective first reference block and the respective second reference block of the pair.

In block 640, a cost comparison between each pair of the first and second reference blocks among a plurality of first reference blocks in the first reference picture and a plurality of second reference blocks in the second reference picture is performed. A cost comparison between the first and second initial reference blocks may be also performed. The first reference blocks may be, for example, the various reference blocks surrounding the first initial reference block 406 in the first reference picture 408. The cost comparison is used to determine a first refined motion vector (e.g., MV0') and a second refined motion vector (e.g., MV1').

The second reference blocks may be, for example, the various reference blocks surrounding the second initial reference block 410 in the second reference picture 412. Alternatively, positions of a pair of reference blocks from the positions of the N pairs of reference blocks is determined as a position of the first refined reference block and a position of the second refined reference block based on the matching cost criterion. It can be understood that the N pairs of reference blocks may include a pair of the first and second initial reference blocks.

In block 642, a first refined reference block (e.g., refined reference block 416) in the first reference picture is selected based on the first refined motion vector and a second refined reference block (e.g., refined reference block 418) in the second reference picture is selected based on the second refined motion vector. Alternatively, the first refined reference block is determined in the first reference picture based on the position of the first refined reference block and the second refined reference block is determined in the second reference picture based on the position of the second refined reference block.

In block 644, a prediction block (e.g., prediction block 420) is determined based on the first refined reference block and the second refined reference block.

In block 646, an image generated using the prediction block is displayed on the display of an electronic device.

Those skilled in the art will recognize that many solutions may be applied to perform a decoder-side motion vector refinement (DMVR) procedure, and embodiments of the present disclosure should not be limited to the previously shown example processes.

Based on the above, embodiments of the present disclosure allow conditionally restricting (such as enable or disable) decoder-side motion vector refinement based on the temporal distances to the two references used by each CU, thus it improves the coding efficiency by not applying the refinement when the underlying assumption of equal and opposite delta motion vectors that the refinement assumes is unlikely to be true.

Based on the above, embodiments of the present disclosure also provide the granularity to disable refinement for all access units unconditionally, disable refinement for certain access units conditionally, enable unconditional refinement at an access unit level, or enable conditional refinement at an access unit based on the temporal distances to the references from the current picture used by a coding unit within that access unit.

Based on the above, the present disclosure also offers the advantage of disabling the refinements performed on the decoder side for merge indices that are unlikely to improve the compression gains.

Also, based on the above, the present disclosure restricts the refinements to only two equal-distance references can have advantage of less cache pollution by the other references on the decoder side.

Based on the above, the present disclosure allows normative disabling of bilateral matching based decoder-side motion vector refinement at the CU level whenever the temporal distances to the two references are not substantially equal in magnitude and opposite in direction. In particular, this disabling is applied when the refinement process does not use temporal distances to scale the delta motion vectors.

Based on the above, the present disclosure adds flags at the sequence and picture parameter set levels to allow the temporal distance based check at the CU level to be performed only when indicated by these flags so that encoder has the option of signaling the appropriate flag values based on factors such as GOP structure and coding gains seen.

Following is an explanation of the applications of the encoding method as well as the decoding method as shown in the above-mentioned embodiments, and a system using them.

Figure 11:
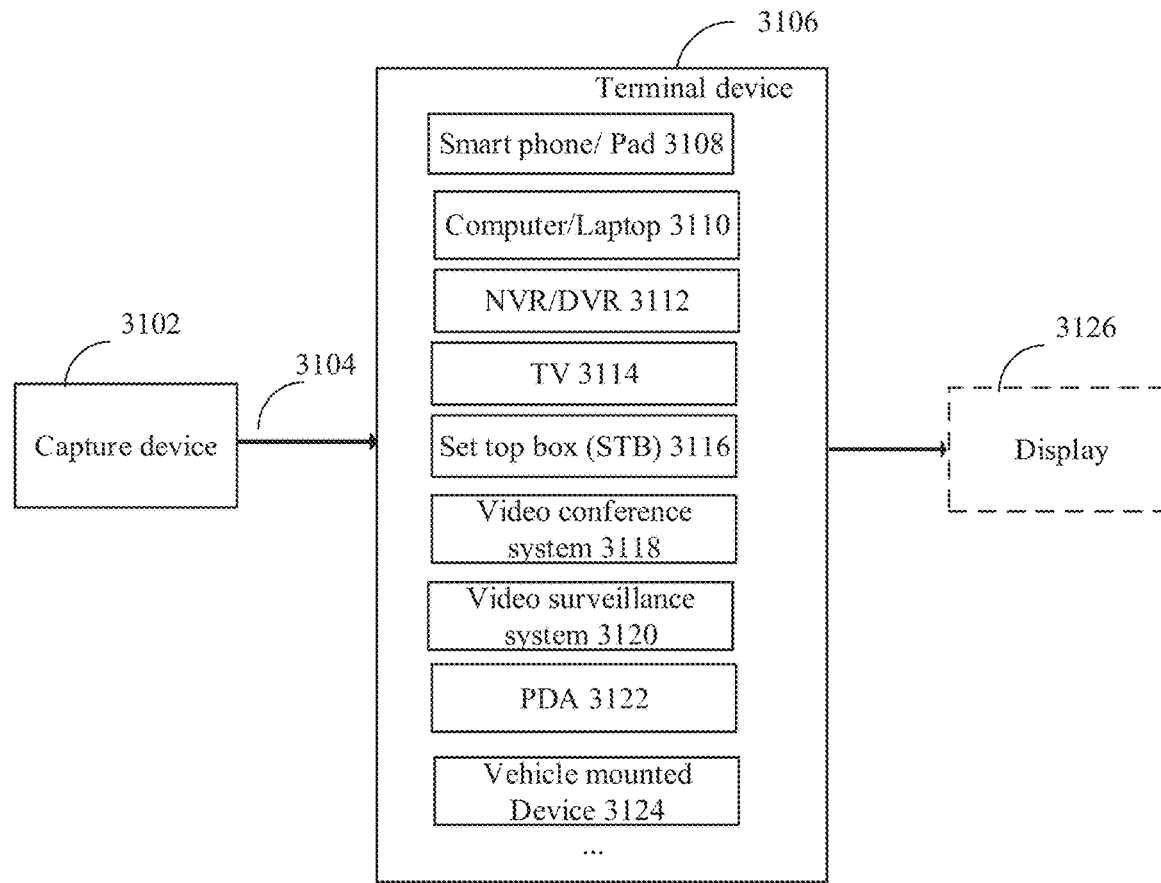
FIG. 11 is a block diagram showing an example structure of a content supply system which provides a content delivery service according to an embodiment.

FIG. 11 is a block diagram showing a content supply system 3100 for realizing content distribution service. This content supply system 3100 includes capture device 3102, terminal device 3106, and optionally includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 12:
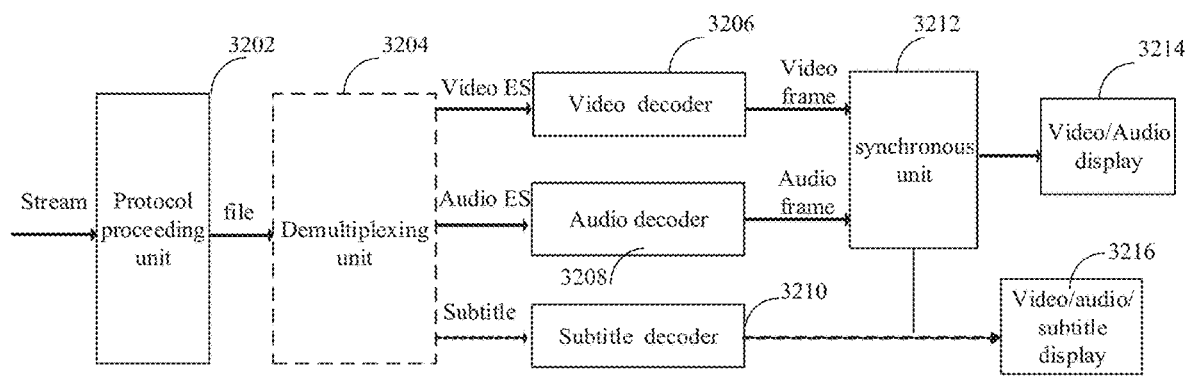
FIG. 12 is a block diagram showing a structure of an example of a terminal device according to an embodiment.

FIG. 12 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. Y) before feeding it to the synchronous unit 3212. Similarly, the audio frame may store in a buffer (not shown in FIG. Y) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A method for inter-prediction of a current image block in a current picture of a video, the method comprising:
when a flag is signaled at a sequence parameter set level or a picture level indicating whether a bi-directional optical flow (BIO) or Bi-directional optical flow (BDOF) procedure is enabled at the sequence parameter set level or the picture level, determining a value of the flag which is signaled at the sequence parameter set level or the picture level;
determining whether a first temporal distance is equal to a second temporal distance, wherein the first temporal distance is represented in terms of a difference between a picture order count value of the current picture and a picture order count value of a first reference picture, and the second temporal distance is represented in terms of a difference between a picture order count value of a second reference picture and the picture order count value of the current picture; and
performing the BIO or BDOF procedure for the current image block, in response to determining that a plurality of conditions are satisfied, wherein the plurality of conditions comprises:
the value of the flag which is signaled at the sequence parameter set level or the picture level, indicating the BIO or BDOF procedure is enabled at the sequence parameter set level or the picture level; and
the first temporal distance is equal to the second temporal distance.

2. The method according to claim 1, further comprising:
performing motion compensation using a first initial motion vector and a second initial motion vector to determine a prediction block of the current image block, in response to determining that the first temporal distance is not equal to the second temporal distance.

3. The method according to claim 2, further comprising:
obtaining initial motion information of the current image block, wherein the initial motion information comprises the first initial motion vector, a first reference index, the second initial motion vector and a second reference index, wherein the first reference index indicates the first reference picture, and the second reference index indicates the second reference picture.

4. A coding device, comprising:
a memory storing instructions; and
a processor coupled to the memory, the processor configured to execute the instructions stored in the memory to cause the processor to:
when a flag is signaled at a sequence parameter set level or a picture level indicating whether a bi-directional optical flow (BIO) or Bi-directional optical flow (BDOF) procedure is enabled at the sequence parameter set level or the picture level, determine a value of the flag which is signaled at the sequence parameter set level or the picture level;
determine whether a first temporal distance is equal to a second temporal distance, wherein the first temporal distance is represented in terms of a difference between a picture order count value of a current picture and a picture order count value of a first reference picture; and the second temporal distance is represented in terms of a difference between a picture order count value of a second reference picture and the picture order count value of the current picture; and
perform the BIO or BDOF procedure for a current image block, in response to determining a plurality of conditions are satisfied, wherein the plurality of conditions comprises:
the value of the flag which is signaled at the sequence parameter set level or the picture level, indicating the BIO or BDOF procedure is enabled at the sequence parameter set level or the picture level; and
the first temporal distance is equal to the second temporal distance.

5. The coding device according to claim 4, wherein the processor is further configured to:
perform motion compensation using a first initial motion vector and a second initial motion vector to determine a prediction block of the current image block, in response to determining that the first temporal distance is not equal to the second temporal distance.

6. The coding device according to claim 5, wherein the processor is further configured to:
obtain initial motion information of the current image block in the current picture, wherein the initial motion information comprises the first initial motion vector, a first reference index, the second initial motion vector and a second reference index, wherein the first reference index indicates the first reference picture, and the second reference index indicates the second reference picture.

7. A non-transitory storage medium comprising an encoded bitstream for a video signal by including a plurality of syntax elements, wherein the plurality of syntax elements comprises a first syntax element, wherein a value of the first syntax element indicates whether a bi-directional optical flow (BIO) or Bi-directional optical flow (BDOF) procedure is enabled or not; and wherein a plurality of operations are performed at least based on the value of the first syntax element, and the operations comprising:
when the first syntax element is signaled at a sequence parameter set level or a picture level indicating whether the BIO or BDOF procedure is enabled at the sequence parameter set level or the picture level, determining the value of the first syntax element which is signaled at the sequence parameter set level or the picture level;
determining whether a first temporal distance is equal to a second temporal distance, wherein the first temporal distance is represented in terms of a difference between a picture order count value of a current picture and a picture order count value of a first reference picture; and the second temporal distance is represented in terms of a difference between a picture order count value of a second reference picture and the picture order count value of the current picture; and performing the BIO or BDOF procedure for a current image block, in response to determining a plurality of conditions are satisfied, wherein the plurality of conditions comprises:

the value of the first syntax element being a flag which signaled at the sequence parameter set level or the picture level, indicating the BIO or BDOF procedure is enabled at the sequence parameter set level or the picture level; and the first temporal distance is equal to the second temporal distance.

8. A non-transitory computer-readable medium storing instructions, which when executed by a processor, cause the processor to perform operations comprising:

when a flag is signaled at a sequence parameter set level or a picture level indicating whether a bi-directional optical flow (BIO) or Bi-directional optical flow (BDOF) procedure is enabled at the sequence parameter set level or the picture level, determining a value of the flag which is signaled at the sequence parameter set level or the picture level;

determining whether a first temporal distance is equal to a second temporal distance, wherein the first temporal distance is represented in terms of a difference between a picture order count value of a current picture and a picture order count value of a first reference picture; and the second temporal distance is represented in terms of a difference between a picture order count value of a second reference picture and the picture order count value of the current picture; and performing the BIO or BDOF procedure for a current image block, in response to determining that a plurality of conditions are satisfied, wherein the plurality of conditions comprises:

the value of the flag which is signaled at the sequence parameter set level or the picture level, indicating the BIO or BDOF procedure is enabled at the sequence parameter set level or the picture level; and the first temporal distance is equal to the second temporal distance.

9. The non-transitory computer-readable medium according to claim 8, wherein the operations further comprise:

performing motion compensation using a first initial motion vector and a second initial motion vector to determine a prediction block of the current image block, in response to determining that the first temporal distance is not equal to the second temporal distance.

10. The non-transitory computer-readable medium according to claim 8, wherein the operations further comprise:

obtaining initial motion information of the current image block, wherein the initial motion information comprises a first initial motion vector, a first reference index, a second initial motion vector and a second reference index, wherein the first reference index indicates the first reference picture, and the second reference index indicates the second reference picture.

11. The coding device according to claim 4, wherein the coding device is an encoding device or a decoding device.

* * * * *